US010511689B2

(12) United States Patent
Das et al.

(10) Patent No.: US 10,511,689 B2
(45) Date of Patent: Dec. 17, 2019

(54) SMALL CELL EDGE COMPUTING PLATFORM

(71) Applicant: QUALCOMM Incorporated, San Diego, CA (US)

(72) Inventors: Soumya Das, San Diego, CA (US); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 14/839,130

(22) Filed: Aug. 28, 2015

(65) Prior Publication Data

US 2017/0064037 A1  Mar. 2, 2017

(51) Int. Cl.
*H04L 29/08* (2006.01)
*H04W 4/18* (2009.01)
*H04W 84/04* (2009.01)

(52) U.S. Cl.
CPC ............. *H04L 67/322* (2013.01); *H04W 4/18* (2013.01); *H04W 84/045* (2013.01)

(58) Field of Classification Search
None
See application file for complete search history.

(56) References Cited

U.S. PATENT DOCUMENTS 5,638,498 A * 6/1997 Tyler ...................... G06K 15/00
358/1.16
6,121,903 A * 9/2000 Kalkstein ............ H03M 7/3086
341/106
6,731,940 B1   5/2004 Nagendran
(Continued)

FOREIGN PATENT DOCUMENTS

EP       2051198 A1    4/2009
EP       2239967 A1   10/2010
(Continued)

OTHER PUBLICATIONS

ISA/EP, International Search Report and Written Opinion of the International Searching Authority, Int'l Application No. PCT/US2016/039847, dated Oct. 13, 2016, European Patent Office, Rijswijk, NL, 11 pgs.

(Continued)

*Primary Examiner* — Adnan Baig
(74) *Attorney, Agent, or Firm* — Holland & Hart LLP

(57) ABSTRACT

A small cell may include a base station that may be co-located with an edge computing device. The edge computing device may be integrated within a small cell base station or be a physically separate module communicatively coupled to and in close proximity with the small cell base station that provides edge computing resources at the small cell. The processing responsibilities associated with received data may be split or divided between the edge computing device and a target mobile device. For example, a portion of data processing may be performed by the edge computing device and the remaining portion of data processing may be performed by the target mobile device. The distribution of processing responsibilities may be based on radio link conditions or conditions (e.g., power state or processing capabilities) associated with the target mobile device.

28 Claims, 12 Drawing Sheets

(56) References Cited

U.S. PATENT DOCUMENTS

| | | |
|---|---|---|
| 8,149,095 B2 | 4/2012 | Hayashi et al. |
| 8,271,507 B2 | 9/2012 | Farmer |
| 8,392,912 B2 | 3/2013 | Davis et al. |
| 8,588,132 B1 | 11/2013 | Paczkowski et al. |
| 8,634,826 B1 | 1/2014 | Cope et al. |
| 8,750,857 B2 | 6/2014 | Krishnaswamy et al. |
| 8,798,017 B2 | 8/2014 | Liu et al. |
| 8,892,686 B1 | 11/2014 | Thibeault et al. |
| 9,001,659 B2 | 4/2015 | Sun et al. |
| 2003/0035464 A1 | 2/2003 | Dehner et al. |
| 2003/0101213 A1 | 5/2003 | Wright |
| 2004/0116115 A1 | 6/2004 | Ertel |
| 2006/0059044 A1 | 3/2006 | Chan et al. |
| 2006/0259359 A1 | 11/2006 | Gogel |
| 2006/0271695 A1 | 11/2006 | Lavian |
| 2007/0038994 A1 | 2/2007 | Davis et al. |
| 2008/0004950 A1 | 1/2008 | Huang et al. |
| 2008/0049020 A1 | 2/2008 | Gusler et al. |
| 2008/0270379 A1 | 10/2008 | Ramakrishna |
| 2010/0057563 A1 | 3/2010 | Rauber et al. |
| 2010/0151821 A1 | 6/2010 | Sweeney et al. |
| 2010/0295676 A1 | 11/2010 | Khachaturov et al. |
| 2010/0318417 A1 | 12/2010 | Brisebois et al. |
| 2011/0047030 A1 | 2/2011 | Yoon et al. |
| 2011/0287787 A1 | 11/2011 | Nagaraja et al. |
| 2011/0300851 A1* | 12/2011 | Krishnaswamy ....... G06F 3/015 455/422.1 |
| 2011/0306324 A1 | 12/2011 | Jang et al. |
| 2012/0008535 A1 | 1/2012 | Kuehnel et al. |
| 2012/0016961 A1 | 1/2012 | Tuikka |
| 2012/0102409 A1 | 4/2012 | Fan et al. |
| 2012/0142319 A1 | 6/2012 | Joshi et al. |
| 2012/0158816 A1 | 6/2012 | Choi et al. |
| 2012/0310717 A1 | 12/2012 | Kankainen |
| 2012/0310746 A1 | 12/2012 | Zhao et al. |
| 2013/0031204 A1 | 1/2013 | Graham et al. |
| 2013/0054729 A1 | 2/2013 | Jaiswal et al. |
| 2013/0109371 A1 | 5/2013 | Brogan et al. |
| 2013/0110617 A1 | 5/2013 | Phan et al. |
| 2013/0151654 A1 | 6/2013 | Brech |
| 2013/0212212 A1 | 8/2013 | Addepalli et al. |
| 2013/0244612 A1 | 9/2013 | Burckart et al. |
| 2013/0267252 A1 | 10/2013 | Rosenberg |
| 2013/0316708 A1 | 11/2013 | MacPherson |
| 2014/0022920 A1 | 1/2014 | Dua et al. |
| 2014/0022985 A1 | 1/2014 | Kalmbach et al. |
| 2014/0098734 A1 | 4/2014 | Kalhan et al. |
| 2014/0129354 A1 | 5/2014 | Soon-Shiong |
| 2014/0143438 A1 | 5/2014 | Kagan et al. |
| 2014/0156793 A1 | 6/2014 | Chan et al. |
| 2014/0171039 A1 | 6/2014 | Bjontegard |
| 2014/0173110 A1 | 6/2014 | Uetabira |
| 2014/0241315 A1 | 8/2014 | Niu et al. |
| 2014/0258533 A1 | 9/2014 | Antony |
| 2014/0297822 A1 | 10/2014 | Agrawal et al. |
| 2014/0310709 A1 | 10/2014 | Nirantar |
| 2014/0337458 A1 | 11/2014 | Barton |
| 2014/0373032 A1 | 12/2014 | Merry et al. |
| 2015/0046656 A1 | 2/2015 | Blinick et al. |
| 2015/0067791 A1 | 3/2015 | Matus |
| 2015/0088656 A1 | 3/2015 | Singh |
| 2015/0133091 A1 | 5/2015 | Baldwin et al. |
| 2015/0161643 A1 | 6/2015 | Randell et al. |
| 2015/0293926 A1 | 10/2015 | Yang et al. |
| 2015/0347730 A1 | 12/2015 | Matus |
| 2015/0351156 A1 | 12/2015 | Xie et al. |
| 2016/0029214 A1 | 1/2016 | Lu |
| 2016/0049071 A1 | 2/2016 | Beaver et al. |
| 2016/0195861 A1 | 7/2016 | Chen et al. |
| 2016/0343032 A1 | 11/2016 | Dewitt et al. |
| 2016/0353424 A1* | 12/2016 | Stirling-Gallacher ...................... H04B 7/0626 |
| 2017/0064029 A1 | 3/2017 | Das et al. |
| 2017/0064066 A1 | 3/2017 | Das et al. |
| 2017/0064543 A1 | 3/2017 | Chakra et al. |
| 2017/0064609 A1 | 3/2017 | Park et al. |
| 2017/0064616 A1 | 3/2017 | Park et al. |
| 2017/0104839 A1 | 4/2017 | Starsinic et al. |
| 2017/0268890 A1 | 9/2017 | Barnard et al. |

FOREIGN PATENT DOCUMENTS

| | | |
|---|---|---|
| EP | 2575044 A1 | 4/2013 |
| EP | 2820869 A1 | 1/2015 |
| JP | 2009212663 A | 9/2009 |
| JP | 2014513449 A | 5/2014 |
| JP | 2015516742 A | 6/2015 |
| WO | WO-0169387 A2 | 9/2001 |
| WO | WO-2011153503 A1 | 12/2011 |
| WO | WO-2012109520 A1 | 8/2012 |
| WO | WO-2013150437 A1 | 10/2013 |
| WO | WO-2014131000 A2 | 8/2014 |
| WO | WO-2015027246 A1 | 2/2015 |

OTHER PUBLICATIONS

Giannoulakis et al., "On the Applications of Efficient NFV Management Towards 5G Networking," 1st International Conference on 5G for Ubiquitous Connectivity, Nov. 26-28, 2014, 5 pgs, ISBN: 978-1-6319-0055-6, DOI: 10.4108/ICST.5GU.2014.258133, XP032735044, Institute of Electrical and Electronics Engineers.

Munoz et al., "Joint Allocation of Radio and Computational Resources in Wireless Application Offloading," Future Network & Mobile Summit 2013 Conference Proceedings, Jul. 3, 2013, pp. 1-10, ISBN: 978-1-905824-37-3, XP032506950, IIMC International Information Management Corporation.

Barbarossa et al., "Communicating While Computing: Distributed Mobile Cloud Computing Over 5G Heterogeneous Networks," IEEE Signal Processing Magazine, Nov. 2014, pp. 45-55, vol. 31 (6), ISSN: 1053-5888, DOI: 10.1109/MSP.2014.2334709, XP011561537, IEEE Service Center, Piscataway, NJ.

Tanaka H., "R & D Hot Corner Solution", NTT Technical Journal, vol. 27, No. 8, The Telecommunications Association, Aug. 1, 2015, vol. 27, pp. 59-63.

* cited by examiner

SMALL CELL EDGE COMPUTING PLATFORM

BACKGROUND

Field of the Disclosure

The present disclosure, for example, relates to wireless communication systems, and more particularly to an edge computing device co-located with a base station of a small cell.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, space and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple wireless devices. Base stations may communicate with wireless devices on downstream and upstream links. Each base station has a coverage range, which may be referred to as the coverage area of the cell. Some of these base stations may be lower-powered base stations, such as a picocells, femtocells, or microcells. Such small cells cover a smaller geographic area than macro cells and allow access by user equipments (UEs) with service subscriptions with the network provider.

Current wireless wide area networks (WWANs) generally place content and cloud resources on nodes outside of the mobile network operator's WWAN, far from the wireless device of the end user accessing the nodes on the other side of the WWAN. Similarly, users of wireless local area networks (WLANs) generally access content and cloud resources on these nodes, which makes the nodes likewise far from wireless device of the end user accessing the WLA. When an end user in communication with a wireless network near the edge of the WWAN or in a WLAN requests content or services, via their wireless device, the content is generally downloaded from these nodes, through the WWAN or WLAN, and delivered to the wireless device via a radio link. Subsequent requests for the same content result in the content again being downloaded from the nodes through the WWAN or WLAN to the wireless device. In addition, video traffic has increased to an ever-larger proportion of data transmitted over WWANs and WLANs. Unpredictable spikes in demand due to viral videos and live television programming, increases in display and content resolution, and the introduction of enhanced user features have all contributed to this increased growth in data usage. Duplication of requested content can waste resources on the backhaul and transport networks. Similarly, during times of high demand where traffic congestion may occur, content delivery may be affected such that the user experience is reduced. For example, costs of providing the requested data may rise, latency or buffering may increase, and/or the quality of delivered data may be reduced, e.g. by transcoding video to a reduced quality level.

Furthermore, wireless devices may have limited battery life and processing power, in particular mobile devices. Applications and processes running on a wireless device (e.g., decoding and encoding content for transmission on the WWAN or WLAN) may use significant mobile device resources. Execution of these applications and processes may shorten battery life and degrade device performance.

SUMMARY

Small cells are radio access nodes that operate beneath the level of the macrocell infrastructure in a wireless network. The small cells may include microcells, femtocells, picocells, and Wi-Fi access points, and access points that integrate wireless wide area network (WWAN) and wireless local area network (WLAN) functions. A small cell may include a base station that may be co-located with an edge computing device. The edge computing device may be integrated within a small cell base station or be a physically separate module communicatively coupled to and in close proximity with the small cell base station that provides edge computing resources at the small cell. For instance, the edge computing device may perform various processing functions for data retrieved from the Internet before relaying the data to a target mobile device. In some examples, the processing responsibilities associated with data may be split or divided between the edge computing device and the target mobile device. That is, a portion of data processing may be performed by the edge computing device and the remaining portion of data processing may be performed by the mobile device. For instance, the edge computing device may be assigned decompression responsibilities. Such distribution of processing may alleviate some or all of the processing responsibilities at the mobile device level, which may reduce power consumption. The distribution of processing responsibilities may be based on mobile device capabilities and metrics, including battery power, processing availability, wireless link quality, temperature, etc.

A method for wireless communication is described. The method may include receiving data for a mobile device in a first small cell, and distributing processing of the received data between computing resources of the mobile device and computing resources of an edge computing device, wherein the edge computing device is co-located with a first base station of the first small cell or a second base station of a neighboring second small cell that is in communication with the first small cell.

An apparatus for wireless communication is described. The apparatus may include means for receiving data for a mobile device in a first small cell, and means for distributing processing of the received data between computing resources of the mobile device and computing resources of an edge computing device, wherein the edge computing device is co-located with a first base station of the first small cell or a second base station of a neighboring second small cell that is in communication with the first small cell.

A further apparatus for wireless communication is described. The apparatus may include a processor, memory in electronic communication with the processor, and instructions stored in the memory. The instructions may be executed by the processor to receive data for a mobile device in a first small cell, and distribute processing of the received data between computing resources of the mobile device and computing resources of an edge computing device, wherein the edge computing device is co-located with a first base station of the first small cell or a second base station of a neighboring second small cell that is in communication with the first small cell.

A non-transitory computer-readable medium storing code for wireless communication at a wireless device is described. The code may include instructions executable to receive data for a mobile device in a first small cell, and distribute processing of the received data between computing resources of the mobile device and computing resources of an edge computing device, wherein the edge computing device is co-located with a first base station of the first small cell or a second base station of a neighboring second small cell that is in communication with the first small cell.

Some examples of the method, apparatuses, or non-transitory computer-readable medium described herein may further include processes, features, means, or instructions for determining a quality of a radio link between the mobile device and the first base station, decompressing the received data at the edge computing device based at least in part on the quality of the radio link, and transmitting the decompressed data to the mobile device. Additionally or alternatively, some examples may include processes, features, means, or instructions for downloading a plurality of versions of the data, and selecting a first version of the plurality of versions of the data to transmit to the mobile device based at least in part on a condition of a radio link used for communication between the mobile device and the first base station or an operating context of the mobile device.

In some examples of the method, apparatuses, or non-transitory computer-readable medium described herein, the operating context comprises at least one of a user preference, a power state of the mobile device, a processing headroom of the mobile device, a processing capability of the mobile device, or a time of day. Additionally or alternatively, some examples may include processes, features, means, or instructions for observing a condition of a radio link used for communication between the mobile device and the first base station, and allocating a processing distribution between the computing resources of the mobile device and the computing resources of the edge computing device based at least in part on the condition of the radio link.

Some examples of the method, apparatuses, or non-transitory computer-readable medium described herein may further include processes, features, means, or instructions for receiving, at the edge computing device, an indication of an operating context of the mobile device, and allocating a processing distribution between the computing resources of the mobile device and the computing resources of the edge computing device based at least in part on the indication. Additionally or alternatively, some examples may include processes, features, means, or instructions for comparing the indication against a threshold associated with the operating context of the mobile device, wherein the threshold is a processing availability threshold, a power availability threshold, or a temperature threshold.

Some examples of the method, apparatuses, or non-transitory computer-readable medium described herein may further include processes, features, means, or instructions for receiving a processing capability report from the mobile device, and processing the data based at least in part on the processing capability report. In some examples, the received data comprises video data. Some examples include determining a quality of a radio link between the mobile device and the first base station, rendering the video data based at least in part on the quality of the radio link, and transmitting the rendered video data to the mobile device for display on the mobile device.

In some examples of the method, apparatuses, or non-transitory computer-readable medium described herein, the received data comprises audio data. Some examples include determining a quality of a radio link between the mobile device and the first base station, decompressing audio data for transmission to the mobile device, the decompressing based at least in part on the quality of the radio link, and transmitting the decompressed audio data to the mobile device for playback on the mobile device. In some examples, wireless communication resources of the first base station are housed in a first module and the edge computing device is housed in a second module in communication with and co-located with the first module. In some examples, the first small cell is one of a first picocell, a first femtocell, a first microcell, or a first wireless fidelity (Wi-Fi) access point, and the second small cell is one of a second picocell, a second femtocell, a second microcell, or a second Wi-Fi access point. In some examples, the first small cell comprises a wireless wide area network (WWAN) transceiver and a wireless local area network (WLAN) transceiver.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
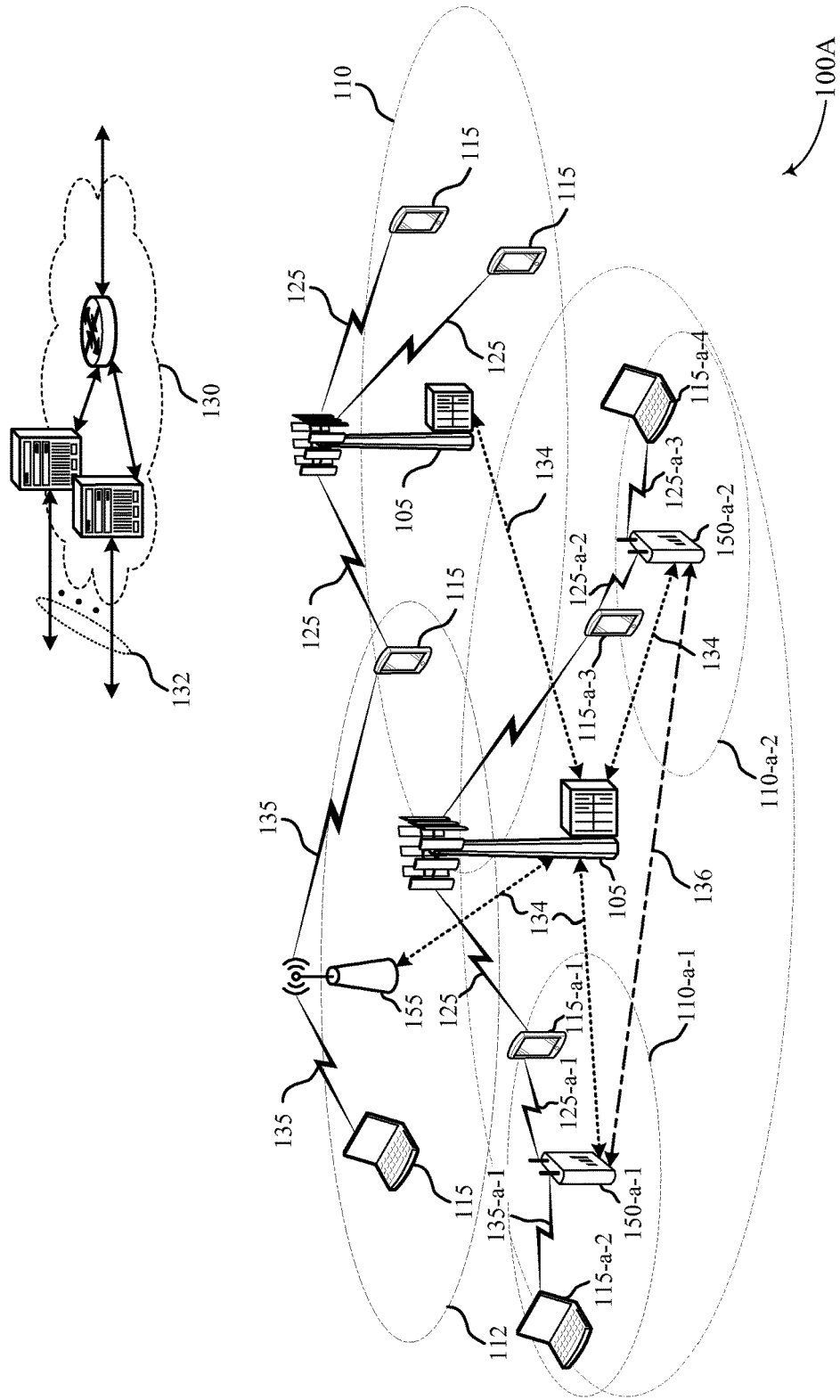
FIG. 1A illustrates an example of a wireless communications system in accordance with various aspects of the disclosure.

In the description that follows, an edge computing device may be co-located with a small cell base station. A small cell base station may include a wireless wide area network (WWAN) radio that operates in licensed and unlicensed spectrum. The WWAN radio may include adaptations that enable operation with other unlicensed band technologies. Small cell base stations, in addition to having WWAN radios, may have wireless local area network (WLAN) radios to connect to a WLAN (e.g. Wi-Fi, Wi-MAX, ZigBee, Bluetooth, etc.). Thus, a small cell base station may also act as a WLAN access point according to the present disclosure. Small cells are radio access nodes that operate beneath the level of the macrocell infrastructure in a wireless network (e.g. microcells, femtocells, picocells, Wi-Fi access points, and access points that integrate WWAN and WLAN functions). Furthermore, small cells have a range that is small compared to macrocells. An edge computing device may be integrated within a small cell base station, or may be a physically separate device that is in communication with the small cell base station. In either case, an edge computing device may be in close proximity to a user's wireless device that is in communication with the edge computing device via the wireless resources of the small cell. The close proximity of small cell base stations to an associated wireless device's position may be harnessed to provide enhanced support and services to the wireless devices and their users.

The described edge computing devices may support the dynamic distribution of processing of data and/or content between the edge computing device and a wireless device in communication with the edge computing device through a small cell. The edge computing devices may also prefetch content, for example webpages, content, and data, and cache it to the edge computing device based on the specific context of a wireless device determined relative to a small cell. An edge computing device may also host an advertising server or engine, providing enriched local advertising, augmented advertisement or other contents, and enabling the augmentation of a user's experience using an output display device in the proximity of the wireless device user. Examples of such augmentation may include providing augmented reality images on top of local mapping data on a mobile device, adding sound, light, and/or other effects on another device, for example on a television, display or other output device in an electronics store. In another example different colored blinking lights on a television or other display may be used to indicate the locations of different people as they move about the electronics store. The augmentation may be of actual reality, for example, by providing sounds, smells, visual stimuli, such as by means of lights, or physical objects, such as bubbles or confetti, to the user of a mobile or wireless device.

The edge computing devices discussed herein may also operate as enriched local advertising servers to augment advertising at the edge computing device or augment a user's experience at an output near the edge computing device. As used herein, advertising may refer to a commercial advertisement, for example to encourage a user to purchase a product or service, but may also refer to the display, communication, or other dissemination of information to a user. For example, a museum may user advertising to tell members of an audience where the displays are in a museum. In another example, a business, my advertising the location of a business meeting to tell a user where to go. These computing resources, as well as additional computing resources that may be surplus or provided specifically for this purpose, may also be provided to host applications, including third party applications, at the edge computing device, and offer services for the small cell users. In some examples, a small cell platform is used to host applications/services for a group of neighboring small cells that may not have the spare compute and other resources (e.g., the small cells may have different capabilities). Surplus computing resources may be extra computing resources for use during a worst-case processor load. The difference between the total computing resources and the computing resources being used under a current processor load is the surplus computing resources. In some examples, the surplus computing resources are additional cores of a multi-core design that may be powered down when computing needs are less. In another example, the surplus computing resources may be a core that is designed for a maximum frequency but is currently operating at a lower frequency.

The described edge computing devices are located away from nodes but are instead in close proximity to wirelessly-connected wireless devices i.e., end users. The disclosed edge computing devices enable local analytics and knowledge generation to occur at the source of the data, near the end user and leverage resources that may not be continuously connected to a network such as laptops, smartphones, tablets and sensors. The herein described edge computing devices may improve response times for requests from wireless devices in communication with the WWAN or WLAN, as well as increase the amount of data that can be used in environments where there is a limited data connection. Prefetching, caching, processing, and/or serving data at the edge computing devices, co-located with small cell base stations, may also reduce overall demand on the backhaul network or internet, and help limit signaling and user traffic to and/or from core networks.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1A illustrates an example of a wireless communications system 100A in accordance with various aspects of the disclosure. The wireless communications system 100A includes base stations 105, wireless devices 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the wireless devices 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the wireless devices 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB (HNB), a Home eNodeB (HeNB), access point, or some other suitable terminology. The geographic coverage area 110 for a base station 105 may be divided into sectors making up only a portion of the coverage area (not shown). The wireless communications system 100A may include base stations 105 of different types (e.g., macro and/or small cell base stations). There may be overlapping geographic coverage areas 110 for different technologies.

In some examples, the wireless communications system 100A is a Long Term Evolution (LTE) or LTE-Advanced (LTE-A) network. In LTE/LTE-A networks, the term evolved Node B (eNB) may be generally used to describe the base stations 105, while the term user equipment (UE) may be generally used to describe the wireless devices 115. The wireless communications system 100A may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a term used by an organization named "3rd Generation Partnership Project" (3GPP) to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A base station for a macro cell may be referred to as a macro eNB or base station. A small cell may be associated with a lower-powered base station, as compared with a macro cell, that may operate in the same or different (e.g., licensed, unlicensed, etc.) frequency bands as a macro cell base station. A base station for a small cell may be referred to as a small cell, a small cell eNB, a small cell base station, a pico eNB or base station, a femto eNB or base station, or a home eNB or base station. A small cell may refer to the communications and devices associated with a small cell base station. For example, small cell base station 150-a-1 may be associated with geographic coverage area 110-a-1, wireless device 115-a-1, communication link 125-a-1, wireless device 115-a-2, and communication link 135-a-1. Similarly, small cell base station 150-a-2 may be associated with geographic coverage area 110-a-2, wireless device 115-a-3, communication link 125-a-2, wireless device 115-a-4, and communication link 125-a-3. A small cell may include picocells, femtocells, and microcells according to various examples. A picocell may cover a relatively smaller geographic coverage area 110 and may allow unrestricted access by UEs with service subscriptions with the network provider. A femtocell also may cover a relatively small geographic area (e.g., a home) and may provide restricted access by UEs having an association with the femtocell (e.g., UEs in a closed subscriber group (CSG), UEs for users in the home, open and multi-operator, and the like). Because a femtocell covers a relatively small geographic footprint, the computing needs of a femtocell may vary significantly from femtocell to femtocell. For example, a femtocell that covers an aisle in a grocery store may have different responsibilities than a femto cell in a library aisle. Thus, femtocells may experience a larger variance in computing needs than macrocells.

A small cell base station 150 may include WLAN radios, and may additionally function as a Wi-Fi access point (AP) for wireless devices 115. Wireless devices 115 may communicate with a small cell base station 150 having Wi-Fi functionality using communication links 135. The small cell base stations 150 may also communicate directly with each other using communication links 136, which may be wired or wireless, and may also communicate with each other using backhaul links 134. The wireless devices 115 may be Wi-Fi only devices or operate in a Wi-Fi only mode.

The wireless communications system 100A may support synchronous or asynchronous operation. For synchronous operation, the base stations 105 and small cell base station 150 may have similar frame timing, and transmissions from different base stations 105 or small cell base stations 150 may be approximately aligned in time. For asynchronous operation, the base stations 105 and small cell base stations 150 may have different frame timing, and transmissions from different base stations 105 or small cell base stations 150 may not be aligned in time. The techniques described herein may be used for either synchronous or asynchronous operations.

The wireless devices 115 are dispersed throughout the wireless communications system 100A, and each wireless device 115 may be stationary or mobile. A wireless device 115 may also include or be referred to by those skilled in the art as a mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a UE, a mobile client, a client, or some other suitable terminology. A wireless device 115 may be a cellular phone, a personal digital assistant (PDA), a wireless modem, a wireless communication device, a handheld device, a tablet computer, a laptop computer, a cordless phone, a wireless local loop (WLL) station, or the like. A wireless device 115 may be able to communicate with various types of base stations 105, small cell base stations 150, and network equipment including macro eNBs, small cell eNBs, relay base stations, and the like.

The communication links 125 shown in wireless communications system 100A may include uplink (UL) transmissions from a wireless device 115 to a base station 105, and/or downlink (DL) transmissions, from a base station 105 to a wireless device 115. The downlink transmissions may also be called forward link transmissions while the uplink transmissions may also be called reverse link transmissions. Each of the communication links 125 may include one or more carriers which may be able to carry one or more waveform signals of different frequencies. The waveform signals may be modulated according to the various radio technologies described above. Each modulated signal may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the wireless communications system 100A, base stations 105, small cell base stations 150, and/or wireless devices 115 may include multiple antennas for employing antenna diversity schemes to improve communication quality and reliability between base stations 105 and wireless devices 115. Additionally or alternatively, base stations 105, small cell base stations 150, and/or wireless devices 115 may employ multiple-input, multiple-output (MIMO) techniques that may take advantage of multi-path environments to transmit multiple spatial layers carrying the same or different coded data.

Wireless communications system 100A may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A wireless device 115 may be configured with multiple downlink CCs and one or more uplink CCs for carrier aggregation. Carrier aggregation may be used with both FDD and TDD component carriers.

In some embodiments, the wireless communications system 100A may include an AP 155. Wireless devices 115 may communicate with an AP 155 using communication links 135, and each wireless device 115 may also communicate directly with one or more other wireless devices 115 via a direct wireless link. Two or more wireless devices 115 may communicate via a direct wireless link when both wireless devices 115 are in the AP geographic coverage area 112 or when one or neither wireless device 115 is within the AP geographic coverage area (not shown). Examples of direct wireless links may include Wi-Fi Direct connections, connections established by using a Wi-Fi Tunneled Direct Link Setup (TDLS) link, and other peer-to-peer (P2P) group connections. The wireless devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within wireless communications system 100A.

In addition to resources for communicating in wireless communications system 100A as a small cell base station, one or more of small cell base station 150-*a*-1 and small cell base station 150-*a*-2 may include or be associated with an edge computing device having a number of edge computing resources to support certain operations for wireless devices 115 in communication with a small cell. Thus, the edge computing resources of one or more of small cell base station 150-*a*-1 and small cell base station 150-*a*-2 may support the dynamic distribution of processing of data and/or content between the small cell base station 150 and a wireless device 115 that is in communication with the small cell base station 150. The edge computing devices may also prefetch content and cache it to the edge computing device based on the specific context of a wireless device 115. An edge computing device may also host an advertising server or engine, providing enriched local advertising, augmented advertisement or other contents, and enabling the augmentation of a user's experience using an output display device in the proximity of the wireless device user. Examples of such augmentation may include providing augmented reality images on top of local mapping data on a mobile device, adding sound, light, and/or other effects on another device, for example on a television, display or other output device in an electronics store. In another example different colored blinking lights on a television or other display may be used to indicate the locations of different people as they move about the electronics store. The augmentation may be of actual reality, for example, by providing sounds, smells, visual stimuli, such as by means of lights, or physical objects, such as bubbles or confetti, to the user of a mobile or wireless device. The edge computing device may also operate as enriched local advertising servers. Computing resources of the edge computing device may also be provided to host applications, including third party applications, on the edge computing device one or more of small cell base station 150-*a*-1 and small cell base station 150-*a*-2.

In some cases, the edge computing device may be used to distribute processing responsibilities between multiple entities. For example, the edge computing device may receive data from a RAN that is intended for a wireless device 115 and allocate certain processing functions to the wireless device 115 while performing the remaining processing functions. That is, the processing of the data may be split between the edge computing device and another device. In some cases, the allocation of the processing work load may be distributed among several devices (e.g., a neighbor small cell base station or edge computing device and the target wireless device 115). The edge computing device may determine or assign the processing responsibilities based on conditions associated with the target wireless device 115, including radio link quality, power conditions, and processing conditions.

Figure 1B:
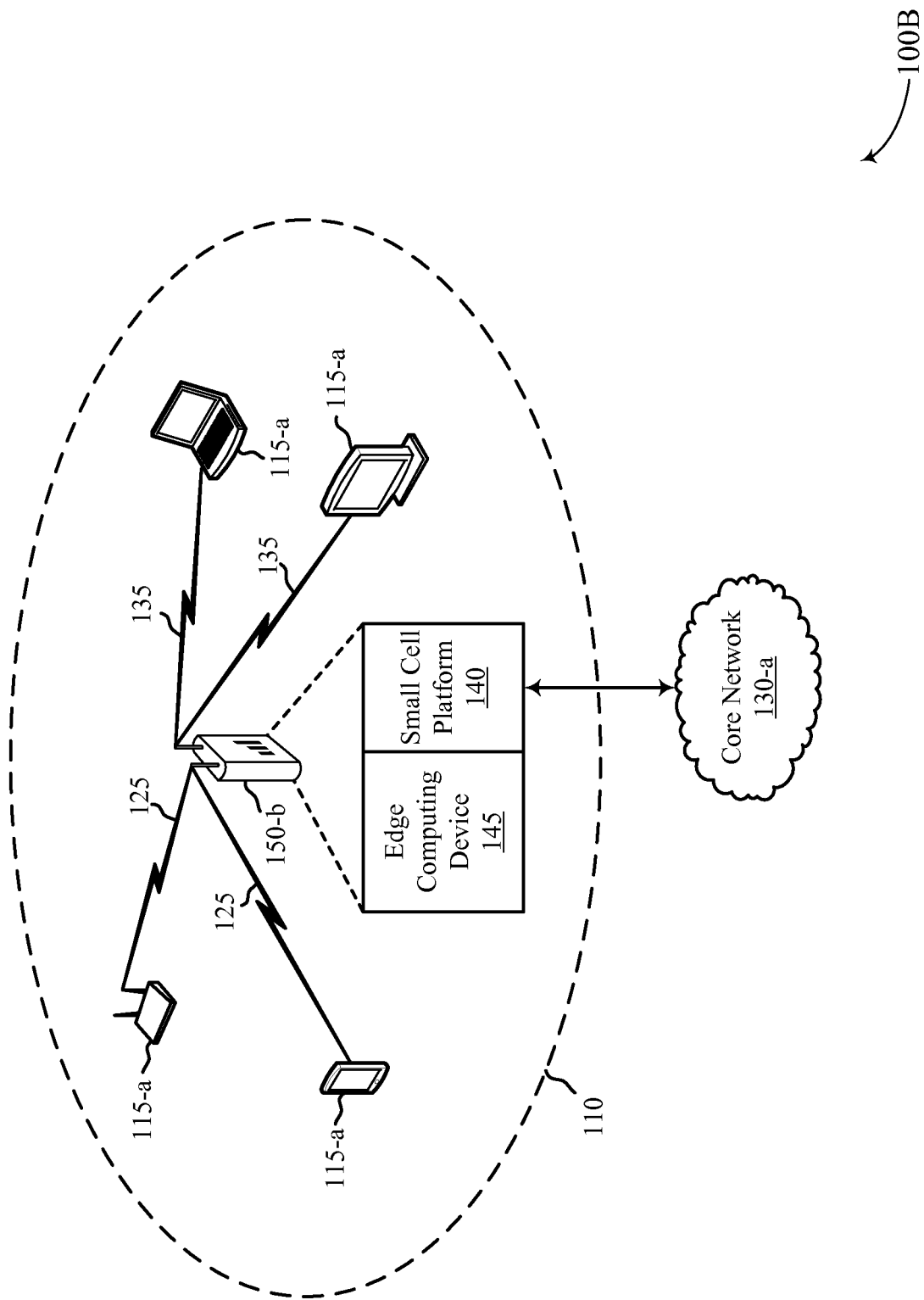
FIG. 1B shows a block diagram of a wireless communications system, in accordance with various aspects of the present disclosure.

Referring to FIG. 1B, a block diagram illustrates an example of a wireless communications network 100B. The wireless communications network 100B may include portions of wireless communications system 100A (e.g., the wireless communications network 100B network may be a portion of a small cell). The wireless communications network 100B may include a small cell base station 150-*b* and one or more wireless devices 115-*a*, such as mobile stations, personal digital assistants (PDAs), other handheld devices, netbooks, notebook computers, tablet computers, laptops, display devices (e.g., TVs, computer monitors, etc.), printers, etc. Each of the wireless devices 115-*a* may associate and communicate with small cell base station 150-*b* via one or more of communication links 125 and communication links 135. Each small cell base station 150-*b* has a geographic coverage area 110 such that wireless devices 115-*a* within that area can typically communicate with the small cell base station 150-*b*. The wireless devices 115-*a* may be dispersed throughout the geographic coverage area 110. Each wireless device 115-*a* may be stationary or mobile. Although not shown in FIG. 1B, a wireless device 115-*a* can be covered by more than one small cell base station 150 and/or macro cell (not shown).

Small cell base station 150-b includes a small cell platform 140 and an edge computing device 145. The edge computing device 145 may be integrated within a small cell base station 150 (e.g., with the small cell platform 140), or be a physically separate module communicatively coupled to and in close proximity with the small cell platform 140. Thus, the small cell base station 150-b may be a single integrated component, or may comprise a greater number of separate components that are communicatively coupled together. In some cases, the small cell platform 140 encapsulates the edge computing device 145. In such instances, the extra processing power on the small cell platform 140 is the edge computing device 145. Small cell base station 150-b, and specifically small cell platform 140, may communicate with core network 130-a, as well as provide connectivity with core network 130-a for the edge computing device 145 and wireless devices 115-a. Small cell base station 150-b, and specifically small cell platform 140, may also provide connectivity for edge computing device 145 with wireless devices 115-a.

Edge computing device 145 provides a number of edge computing resources and functions at the small cell base station 150-b that will be further set out below and in greater detail throughout this disclosure.

The edge computing device 145 may provide processing resources to support one or more wireless devices 115-a. Processing of data may be dynamically allocated between a wireless device 115-a and an edge computing device 145 co-located with the small cell base station 150-b. Processing responsibilities for data downloaded and to be delivered to the wireless device 115-a can be allocated to the wireless device 115-a, to the edge computing device 145, or split between the wireless device 115-a and the edge computing device 145. The allocation of processing responsibilities can be dynamic, for example based on a state of the wireless device 115-a, the quality of the radio link between the small cell base station and the wireless device 115-a, and/or the type of data to be delivered to the wireless device 115-a. The edge computing device 145 may be allocated responsibility to decompress (decode) data that is compressed (encoded) based at least in part on the type of compressed data (e.g. specifically for a particular type of compressed video, audio, or image data). Processing of compressed data by the edge computing device 145 may involve decompressing the compressed data, or processing compressed data into a less-compressed state (i.e. decompressing data compressed at a high level into an uncompressed state and then compressing the data using a compression algorithm or encoder using a lower compression level). The edge computing device 145 may also download multiple versions of the same compressed data, where one of the versions is sent to the wireless device 115-a based at least in part on a condition of the radio link or state of the wireless device 115-a.

Processing responsibilities may also be allocated to the edge computing device 145 according to a state of the wireless device 115-a, for example power consumption at the wireless device 115-a, or processing capability, processing availability, or headroom, battery state, coexistence problems due to concurrent utilization of different radios, or thermal state of the wireless device 115-a. Processing may be further allocated to the edge computing device 145 when the processing availability of the wireless device 115-a is below a threshold, when the battery life is below a threshold, where a temperature of the wireless device 115-a is above a threshold, or where the expected power consumption of the processing at the wireless device 115-a would exceed a predetermined power consumption threshold. The edge computing device 145 may also process, or not process, received data according to a processing capability report received from the wireless device 115-a. In addition, the edge computing device 145 may be allocated processing responsibility based on, for example, the observed quality of the radio link between the wireless device 115-a and the edge computing device 145/small cell base station 150-b, radio conditions, throughput, measurements, or expected future radio conditions (e.g., where the wireless device 115-a is travelling to, hand-off scenarios, loading, etc.).

Content may also be prefetched or otherwise retrieved by the edge computing device 145 and cached locally in anticipation of requests for such content from a wireless device 115-a. Prefetching of the content may be determined at least in part on information that is local to the edge computing device 145, including hyper-local information. Such local information may include the physical location of the edge computing device 145, the physical location of the wireless device 115-a, or input about the physical location based on data gathered from a sensor or other input device of the edge computing device 145 (e.g. from a microphone, temperature sensor, light sensor, or camera). Local information may also include previously assembled profiles for users of wireless device 115-a, including users' past requests for particular data. Local information may also relate to requests made by a user for related content. For example, for a video, prefetched content can include the same video previously requested by users of other wireless devices 115-a, the next segment in a series of videos where a segment has been previously requested by a wireless device 115-a in communication with the edge computing device 145, or videos related to a video previously fetched in response to a previous request from a wireless device 115-a.

Prefetching and locally caching at an edge computing device 145 may use additional storage capacity at the edge computing device 145, but it may be beneficial to allow content to be prefetched during periods of low usage of a backhaul network, saving bandwidth and decreasing latency. Prefetching may also potentially eliminate the need to repeatedly transport the same popular content from the source of the content to the requesting wireless device 115-a. Prefetching as described above may be especially beneficial where the content does not change substantially over time (e.g. a certain music video or audio file), and there is a higher likelihood that users of the wireless device 115-a will request such content via the edge computing device 145 prior to the content becoming stale. The prefetched content for a particular wireless device 115-a may also be transferred from a first edge computing platform to a second edge computing platform based on the expected physical location of the wireless device 115-a. Prefetching may also be performed when more power is available (e.g., the sun is out for small cells powered by solar panels) or when power levels are high (e.g., battery backup capacity is topping out). Further, pre-fetching can be performed being context aware. For example, augmented content can be pre-fetched in a small cell as opposed to augmentation being done on the small cell.

The edge computing device 145 discussed herein may also operate as an enriched local advertising server. Advertising at the edge computing device 145 or at an output near the edge computing device 145 may be augmented by the edge computing device 145. The edge computing device 145 may also serve advertisement data to the small cell and/or output near the small cell. An advertising server may run on the edge computing device 145, where the advertising server is configured to dynamically insert advertising content and data into content requested by the wireless device 115-*a* via the small cell. Specific advertising data and content may also be prefetched and cached at the edge computing device 145 based on the physical location of the edge computing device 145, and/or the location of the wireless device 115-*a* relative to the edge computing device 145. For example, an advertising server running on the edge computing device 145 may serve up content specifically targeted to users of wireless device 115-*a* operating in a sports stadium or grocery store aisle.

In some examples, prefetching and caching may be reactive. That is, prefetching and caching may be performed when the same or similar content is requested by at least one user. Content may be pre-fetched and cached when the small cell determines that the content is likely to be viewed by other users in the proximity. This determination may be based in part on, for example, user profiles for the users. Content may also likely be pre-fetched or consumed due to actions of other nearby users, who may not necessarily consuming the same content. Content may be pre-fetched and cached based on requested content on nearby or similar cells, which may be further based on demographics of the users.

The different edge nodes may have the same or differing storage and processing capabilities. In some examples, several small cells may form a cluster of small cells with a small cell acting as a cluster-head. The cluster-head small cell may be used for local storage, local service hosting, processing, and the like. In some examples, edge nodes have distributed processing and storage capabilities. Distributed caching may be performed amongst edge nodes (e.g., small cells). For example, some nodes may cache some content and other nodes cache other content (caching across sites can be a function of storage, backhaul, use, etc.). Caching can also be performed across multiple wireless devices, such as data being hashed across multiple devices.

Specific advertising data and content may also be prefetched and cached based at least in part on activity performed by a wireless device 115-*a* or other information collected by small cell base station 150-*b* about wireless device 115-*a*, including wireless device 115-*a* previously connected to the small cell base station 150-*b*, or connected to other small cell base stations. This activity or information about wireless device 115-*a* may include contents of past search requests, meta data concerning wireless device 115-*a*, web site visitation or application usage history, or information from one or more sensors of wireless device 115-*a*, for example gyroscope, accelerometer, temperature, or GPS sensors, information. The advertising data and content may also be prefetched and cached based at least in part on analytics for activity performed by other wireless devices, including wireless devices previously connected to small cell base station 150-*b* or other small cell base stations such as neighboring base stations. Such activity and information may be the same as for wireless device 115-*a*, but collected and analyzed for the other wireless devices. In addition, the advertising server can communicate with other local input/output (I/O) devices to provide physical stimuli to the user of the wireless device 115-*a* in addition to the wireless device 115-*a* itself. For example, the advertising server may direct the edge computing device 145 to activate lights, displays, speakers, devices to distribute scents, or other output devices that are physically located in proximity to the edge device and/or wireless device 115-*a* in connection with a request for content from the wireless device 115-*a*.

The edge computing device 145 may also perform local analytics for a wireless device 115-*a* based on contextual data for the wireless device 115-*a*, for example the physical location or trajectory of the wireless device 115-*a*, or the location, surroundings, etc. of other wireless devices 115-*a* in communication with the small cell base station 150 where the edge computing device 145 is located. Such performance of local analytics by an edge computing device 145 may enhance user experience (e.g., when the user is in a small cell area with a dense deployment). For example, a user in a congested network may experience delays due to an excess of wireless traffic. Additionally, a central entity responsible for performing analytics may not have the local contextual information needed to supply location-specific services. Thus, offloading certain analytics to an edge computing device 145 (or a small cell base station 150) may decrease service delays and enable service relevant to the specific location of the user. For example, running an ad server on a small cell base station 150 or edge computing device 145 may reduce latency and provide richer content (e.g., contextually or situationally relevant content). In some cases, processing may be moved to and from the edge computing device 145 and wireless device 115-*a* based on availability of processing power and needs. The processed analytics data concerning location, user searches, may inform Google® Ad Words®, bidding for advertisement, etc.

Running an advertising server on the edge computing device 145 may allow the advertiser to serve richer advertising content by reducing the backhaul bandwidth required to serve the advertisements and reduce latency to deliver the advertisements to the user of the wireless device 115-*a*. As a result, it may be less expensive for a network operator to provide the advertising, because of the reduced use of network bandwidth, for example the backhaul network of a WWAN or an internet service provider (ISP) in communication with a WLAN. In such a case the WWAN network operator or ISP may provide a discounted data rate to the user of the wireless device 115-*a* for advertising data served to the wireless device 115-*a* from the network computing device.

As a result of the proximity of edge computing device 145 to the WWAN small cell or WLAN access point, the edge computing device 145 may also control proximate I/O devices, also in communication with the edge computing device 145, to interact with and provide stimuli to the user of the wireless device 115-*a* according to a location of the user of the wireless device 115-*a*, sensor input from the wireless device 115-*a* or edge computing device 145, and/or the content of requests made by the wireless device 115-*a* user via the edge computing device 145.

The edge computing device 145 may also take in data concerning the location and environment of a wireless device 115-*a*, and by extension the user of the wireless device 115-*a*, to control input/output devices to stimulate a wireless device 115-*a* user. Sensor data for the wireless device 115-*a* and/or edge computing device 145 may be collected (e.g. from an input device such as a microphone, temperature, or light sensor, or camera). Because of the close proximity of the wireless device 115-*a* and the edge network device to which the wireless device 115-*a* is connected as well as the known location of the edge computing device 145, the edge computing device 145 may use this information to control, according to data at the edge computing device 145, a device (e.g., an output device) external to the wireless device 115-*a* itself that is within the known proximity of the user of the wireless device 115-*a*. The external device may deliver or serve advertising content or data. For example, an external device may be controlled by the edge computing device 145 to annotate data content provided to the edge computing device 145 by the wireless device 115-*a* according to information specific to the physical environment of the edge computing device 145. Annotating may include annotating the data content with images or text. As another example, the edge computing device 145 may control an I/O device (external to the edge computing device 145) to provide a stimulus to the user of the wireless device 115-*a* based on at least one characteristic of the wireless device 115-*a* user determined from the edge computing device 145 (e.g., a physical location of the wireless device 115-*a* by virtue of proximity to the small cell base station to which the wireless device 115-*a* is connected, or the content of a request made by the user of the wireless device 115-*a*).

The edge computing device 145 may also have surplus computing resources that may host third party applications. These computing resources may also be provided for such purpose. Mobile applications typically run on a wireless device 115-*a* or on a network component, such as a content delivery network, or other server. At the same time, wireless device 115-*a* generally have limited computing power and battery life, while an edge computing device 145 will likely have a dedicated power connection. Thus, edge computing device 145 may be configured to allow use by third-party applications in close proximity to the end user (i.e., the wireless device 115-*a*), but with fewer power and processing constraints than the wireless device 115-*a*.

In an example, an application running on a user's mobile device may be enhanced by a complementary application running on the edge computing device 145. The complementary application may provide processing that enhances the user experience, for example by monitoring incoming messages to the wireless device 115-*a* and sending alerts according to predefined parameters. The resources of the edge computing device 145 may also be provided as a service to a third party, for example by providing a virtual machine running on the edge computing device 145 to run the third party application. This way, the third party can provide an enhanced experience to the user of a wireless device 115-*a* by running the third party's own application in close proximity to the wireless device 115-*a*, but where the application is under the direction and control of the third party. The third party can cache selected data or content to the edge computing device 145, and provide an application to the wireless device 115-*a* that interacts with the cached data or content. The application of the wireless device 115-*a* may also be provided to interact with the application running on the edge computing device 145 or server. Thus, the wireless device 115-*a* application may interact with distant servers through the WWAN and/or internet less frequently, enhancing the experience of the wireless device 115-*a* user. In addition, computation performed by the third-party application for the wireless device 115-*a* may be moved or transferred from the edge computing device 145 to a second edge computing device to follow a wireless device 115-*a* of the user from the edge computing device 145 to the second edge computing device.

Figure 2:
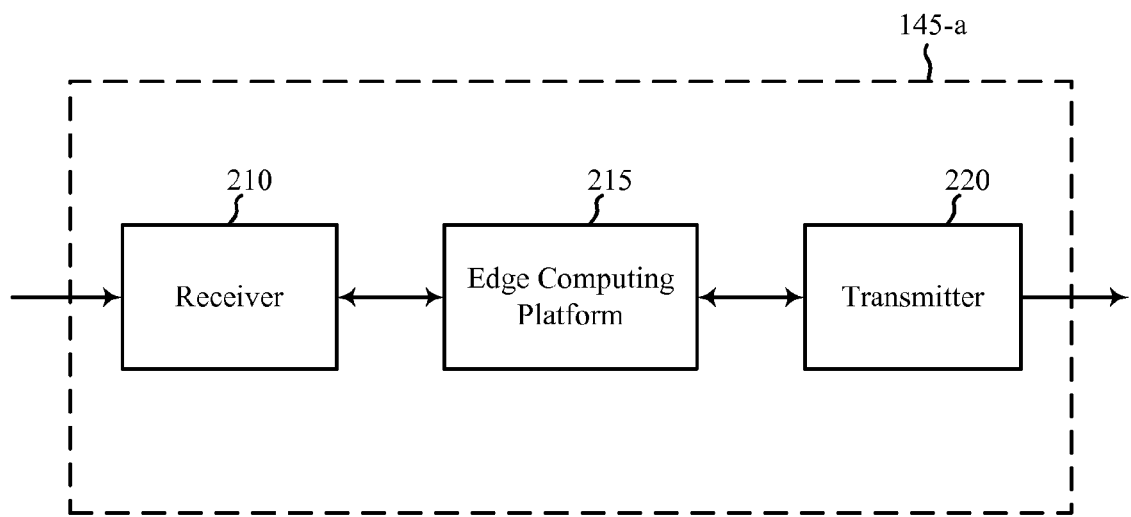
FIG. 2 shows a block diagram of a device configured for use in wireless communication to support an edge computing platform, in accordance with various aspects of the present disclosure.

FIG. 2 shows a block diagram 200 of an edge computing device 145-*a* configured for use in wireless communication to support an edge computing device for a small cell, in accordance with various aspects of the present disclosure. In some cases, the edge computing device 145-*a* may be co-located with a small cell base station 150. The edge computing device 145-*a* may be an example of one or more aspects of an edge computing device 145 described with reference to FIG. 1B. The edge computing device 145-*a* may include a receiver 210, an edge computing platform 215, and/or a transmitter 220. The edge computing device 145-*a* may also be or include a processor (not shown). Each of these modules may be in communication with each other. In some cases, the edge computing device 145-*a* may be integrated with a small cell base station 150. In such cases, the edge computing device 145-*a* may provide additional computing power for the small cell base station 150 and thus may not include the receiver 210 or the transmitter 220.

The edge computing device 145-*a* may, through the receiver 210, the edge computing platform 215, and/or the transmitter 220, be configured to perform functions described herein. For example, the edge computing device 145-*a* may be configured to provide edge computing resources for a wireless device that is in communication with a small cell. Although the edge computing device 145-*a* is shown encapsulating the edge computing platform 245, in some cases, the edge computing platform 245 encapsulates the edge computing device 145-*a*. That is, the edge computing device 245 may surround or include the edge computing device 145-*a*, the received 210, and/or the transmitter 220. Thus, the edge computing platform 245 may leverage the functionality of the edge computing device 145-*a* to boost processing power.

The components of the edge computing device 145-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 210 may receive information such as packets, user data, and/or control information associated with various information channels (e.g., control channels, data channels, etc.). The receiver 210 may be configured to receive content, data, and other information requested from a network by a wireless device, which may include audio, video, advertising, webpage, or other data from a network at the request of a wireless device in communication with a small cell such as with the edge computing device 145-*a*, requests for such content or data sent from a wireless device, as well as requests to use edge computing resources by wireless devices, and inputs from various sensor or input/output devices. In some cases, the receiver 210 may receive multiple versions of the same data from different sources. Information may be passed on to the edge computing platform 215, and to other components of the edge computing device 145-*a*.

The transmitter 220 may transmit one or more signals received from other components of the edge computing device 145-*a*. The transmitter 220 may transmit audio, video, advertising, webpage, or other data to a wireless device in communication with the small cell such as with the edge computing device 145-*a*, responses to requests to use edge computing resources by wireless devices, and outputs to displays, lights, or other input/output devices. In some examples, the transmitter 220 may be co-located or integrated with the receiver 210 in a transceiver module.

Figure 3:
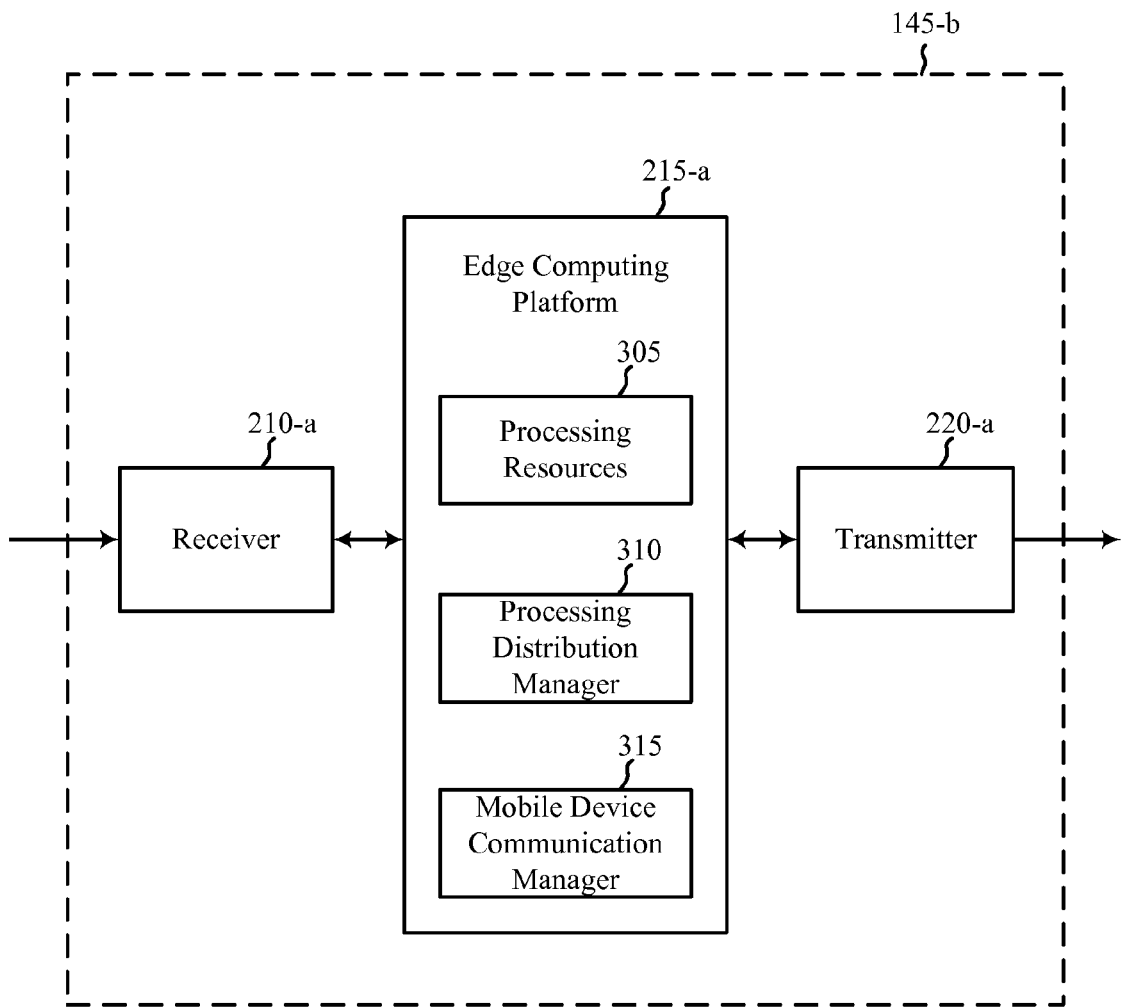
FIG. 3 shows a block diagram of a device configured for use in wireless communication to support an edge computing platform, in accordance with various aspects of the present disclosure.

FIG. 3 shows a block diagram 300 of an edge computing device 145-*b* configured for use in a wireless communications system for dynamically distributing data or content processing, in accordance with various aspects of the present disclosure. The edge computing device 145-*b* may be an example of aspects of an edge computing device 145, 145-*a* described with reference to FIGS. 1B and 2. The edge computing device 145-*b* may include a receiver 210-*a*, an edge computing platform 215-*a*, and a transmitter 220-*a*, each of which may perform the functions described with reference to FIG. 2. The edge computing platform 215-*a* may include processing resources 305, a processing distribution manager 310, and a mobile device communication manager 315.

The processing resources 305 may include components capable of performing the processing functions described herein. The processing functions may be performed on data received from an external source (e.g., a RAN). For example, the processing resources 305 may include components for compressing and decompressing received data (e.g., the processing resources 305 may decompress received audio data for transmission to a wireless device 115). In one case, the processing resources 305 may decompress received data that is compressed with a first compression algorithm and recompress the data according to a second compression algorithm (e.g., the processing resources 305 may transcode the data). Additionally, the processing resources 305 may include components for evaluating content (e.g., web content) and/or components for rendering content (e.g., the processing resources 305 may render video data for transmission to a wireless device 115 for display on the wireless device 115). The processing resources 305 may be used to transform received data (e.g., from the RAN) into a form that requires less processing at a wireless device 115.

In certain instances, the processing resources 305 may perform different levels of processing (e.g., rendering) for different versions of the same data (e.g., data that has been pre-downloaded). The levels of processing may be based on radio (air interface) link conditions or the operational state of the target wireless device 115. In some cases, only a portion of the processing resources 305 may be used to transform received data due to a distribution of processing responsibilities between the edge computing device 145-*b* and an associated wireless device 115. For example, the edge computing device 145-*b* may refrain from evaluating web content data because such a responsibility is assigned to another device (e.g., the associated wireless device 115 or another edge computing device 145). The processing resources 305 and capabilities of edge computing device 145-*b* may be different from the processing resources, capabilities, and storage of other devices 205-*a*.

The processing distribution manager 310 may assign processing responsibilities to the edge computing device 145-*b* or an associated wireless device 115. For example, the processing distribution manager determine which processing functions are performed at the edge computing device 145-*b* and which processing functions are performed at the wireless device 115. In some cases, the processing work load may be allocated between a group of edge computing devices 145 (or a group of small cell base stations 150), and an individual wireless device 115 (e.g., the processing responsibilities may be divided between edge computing devices 145 that neighbors edge computing device 145-*b* and the wireless device 115). That is, the edge computing device 145-*b* may work in conjunction with a number of other devices to process data intended for a wireless device 115.

The processing distribution manager 310 may determine (e.g., divide) processing responsibilities dynamically. For instance, the distribution of processing responsibilities may be in response to a message from an external entity (e.g., the wireless device 115) or autonomously determined (i.e., independent of external prompts). For example, the allocation may be based on a processing distribution request or command, or wireless device 115 information (e.g., the operating context of the wireless device 115). The wireless device 115 information may be received from the wireless device 115 or another communications device (e.g., the information may be relayed via another communications device). The operating context of a wireless device 115 may include information regarding the power state of the wireless device 115 (e.g., battery life, power consumption), the processing headroom of the wireless device 115, and the processing capabilities of the wireless device 115. Additionally or alternatively, distribution of processing responsibilities may be based radio link conditions associated with the wireless device 115. For instance, the processing distribution manager 310 may assign processing responsibilities based on the quality of an air interface link between the edge computing device 145-*b* and the wireless device 115. In one example, the processing resources 305 may be assigned video rendering and send out uncompressed or less compressed data when the wireless device 115 is in good signal quality or when the wireless device 115 is in thermal mitigation.

In some cases, the processing responsibilities assigned to each processing contributor may be based on an evaluation of various costs associated with performing the processing functions as allocated. The costs may be determine for the devices involved in the communal processing scheme. The comparison may be between different distribution combinations. For example, the processing distribution manager 310 may determine the processing cost associated with a wireless device 115 receiving compressed data and the communication cost associated with the edge computing device 145-*b* transmitting uncompressed data. The processing distribution manager 310 may evaluate the determined costs and determine which cost is acceptable. In some cases, the costs may be prioritized. In this or other aspects, the costs may be compared to corresponding thresholds to determine the respective levels of acceptability.

The mobile device communication manager 315 may facilitate or manage communications associated with devices that are communicatively coupled (e.g., via wired or wireless means) with the edge computing device 145-*b*. The mobile device communication manager 315 may, in conjunction with the transmitter 220-*a*, send messages indicating processing responsibilities to wireless devices 115. In some cases, the mobile device communication manager 315 may facilitate transmissions of a requests for information. For example, the mobile device communication manager 315 may send a message to a wireless device 115 requesting information that is specific to the wireless device 115 (e.g., battery information, power consumption information, processing availability information, etc.). Accordingly, the mobile device communication manager 315 may receive (e.g., via communication with the receiver 210-*a*) information (e.g., in a report) pertaining to a wireless device 115. The received information may correspond to a request instigated by the mobile device communication manager 315, or it may be independent of such a request (e.g., the report may be due to expiry of a timer, or a change in battery/power consumption conditions that satisfies a threshold). In certain aspects, the mobile device communication manager 315 may facilitate the transmission of processing assignments to devices involved in the shared processing scheme (e.g., a wireless device 115 or another device 205).

The processing assignments may be determined via communication with the processing distribution manager 310. In an alternative example, a wireless device 115 may determine its processing responsibilities based on the condition of the received data.

In some cases, the mobile device communication manager 315 may facilitate pre-downloading different versions of data for different rendering or air link conditions. For example, the edge computing device 145-b may pre-download and cache frequently viewed data. The different versions may be from different sources (e.g., one version may be from YouTube® and one version may be from CNN). The data may be the same content but have different resolutions or rates. Based on the conditions associated with a wireless device 115 (e.g., radio link quality, user preference, power state, processing headroom, processing capabilities), the edge computing device 145-b may disseminate the version of the data that is most appropriate (e.g., the edge computing device 145-b may select for transmission the highest resolution version of the data that does not exceed an overhead threshold of the target wireless device 115). In some cases, the selection of the version of the data may based on other conditions or parameters, such as the time of day.

In certain examples, there may be different levels or layers of edge computing devices. For example, the edge computing device 145-b may be part of be a small cell base station 150 that serves a wireless device 115. Alternatively, the edge computing device 145-b may be a wireless device 115 that serves as an edge computing device for a lower (e.g., less sophisticated, lower-powered) communication device. In one example, edge computing device 145-b may serve as an edge computing device for a wireless device 115 which in turn may serve as an edge computing device for another communication device (e.g., a smart watch). In such cases, the distribution of processing responsibilities may be adjusted so that they are spread across all layers. That is, each device may perform a share of the processing functions associated with the type of data. The distribution of processing responsibilities may be based on constraints and parameters associated with one or more of the involved devices.

Figure 4:
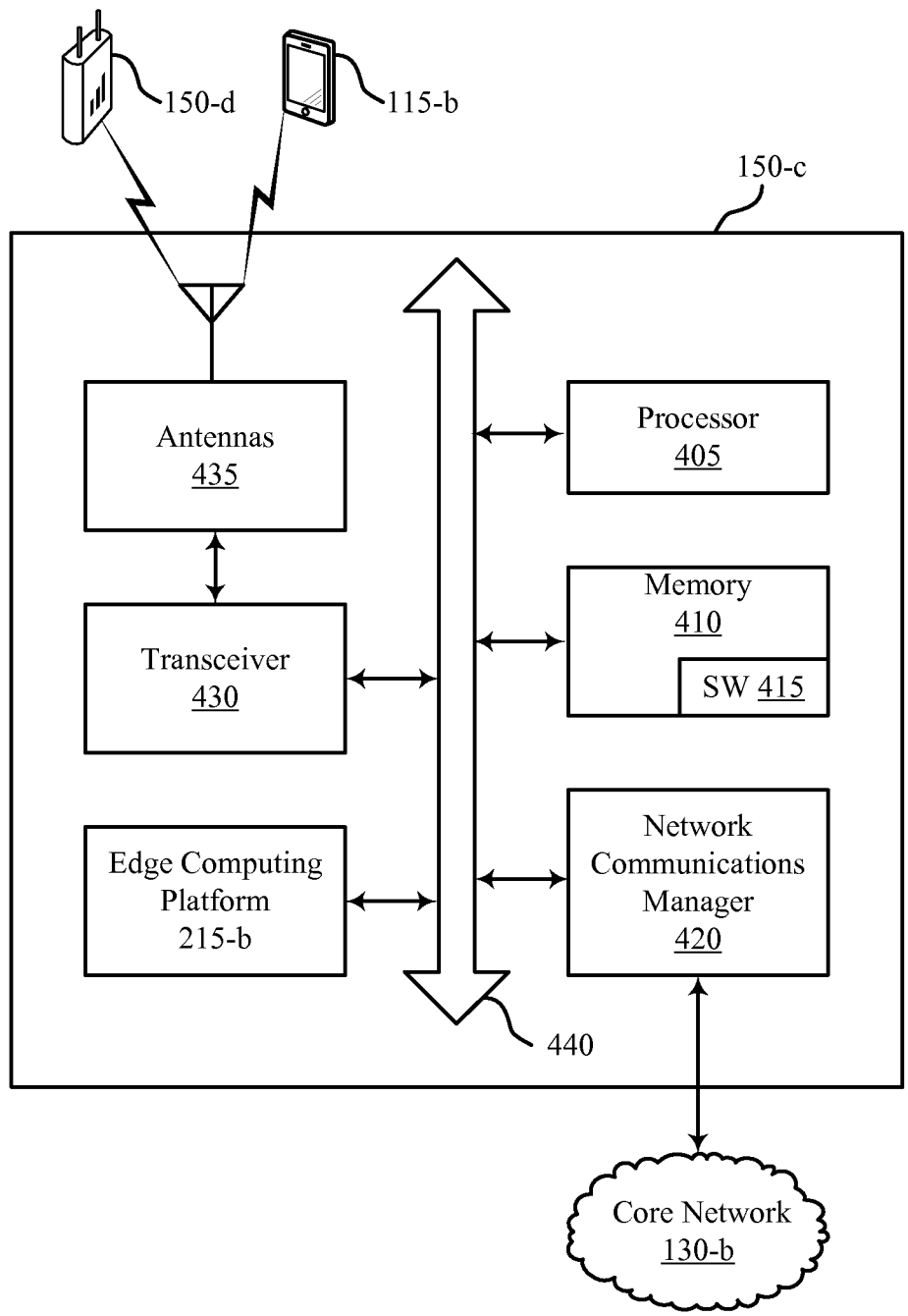
FIG. 4 shows a diagram that illustrates a small cell base station configured for providing edge computing resources co-located with the small cell base station, in accordance with various aspects of the present disclosure.

FIG. 4 shows a diagram 400 that illustrates a small cell base station 150-c configured for providing edge computing resources co-located with the small cell base station 150-c, in accordance with various aspects of the present disclosure. In some aspects, the small cell base station 150-c may be an example of the small cell base stations 150 of FIGS. 1A-1B. The small cell base station 150-c may include a processor 405, a memory 410, a transceiver 430, antennas 435, and an edge computing platform 215-b. The edge computing platform 215-b may be an example of the edge computing platform 215 of FIGS. 2-3. In some examples, the small cell base station 150-c may also include a network communications manager 420. Each of processor 405, memory 410, transceiver 430, network communications manager 420, and edge computing platform 215-b may be in communication with each other, directly or indirectly, over at least one bus 440.

The memory 410 may include random access memory (RAM) and read-only memory (ROM). The memory 410 may also store computer-readable, computer-executable software (SW) code 415 containing instructions that are configured to, when executed, cause the processor 405 to perform various functions described herein to provide edge computing resources to wireless devices in communication with the small cell base station 150-c, for example as further described with reference to FIGS. 1A, 1B, 2, and 3. Alternatively, the code 415 may not be directly executable by the processor 405 but be configured to cause the computer (e.g., when compiled and executed) to perform functions described herein.

The processor 405 may include an intelligent hardware device (e.g., a central processing unit (CPU), a microcontroller, an ASIC, etc.). The processor 405 may process information received through the transceiver 430 and/or the network communications manager 420. The processor 405 may also process information to be sent to the transceiver 430 for transmission through the antennas 435 and/or to the network communications manager 420. The processor 405 may handle, alone or in connection with the edge computing platform 215-b, various aspects related to providing edge computing resources to wireless devices 115 in communication with the small cell base station 150-c.

The transceiver 430 may include a modem configured to modulate packets and provide the modulated packets to the antennas 435 for transmission, as well as to demodulate packets received from the antennas 435. The transceiver 430 may be implemented as at least one transmitter module and at least one separate receiver module. The transceiver 430 may be configured to communicate bi-directionally, via the antennas 435, with at least one wireless device 115 as illustrated in FIGS. 1A and 1B, for example. The small cell base station 150-c may typically include multiple antennas 435 (e.g., an antenna array). The small cell base station 150-c may communicate with a core network 130-b through the network communications manager 420. The small cell base station 150-c may communicate with other small cell base stations 150, such as small cell base station 150-d using the transceiver 430 and antennas 435.

The components of small cell base station 150-c may be configured to implement aspects discussed above with reference to FIGS. 1A, 1B, 2, and 3, and those aspects are not repeated here for the sake of brevity. Moreover, the components of the small cell base station 150-c may be configured to implement aspects discussed below with respect to FIGS. 5-11 and those aspects are not repeated here also for the sake of brevity.

Figure 5:
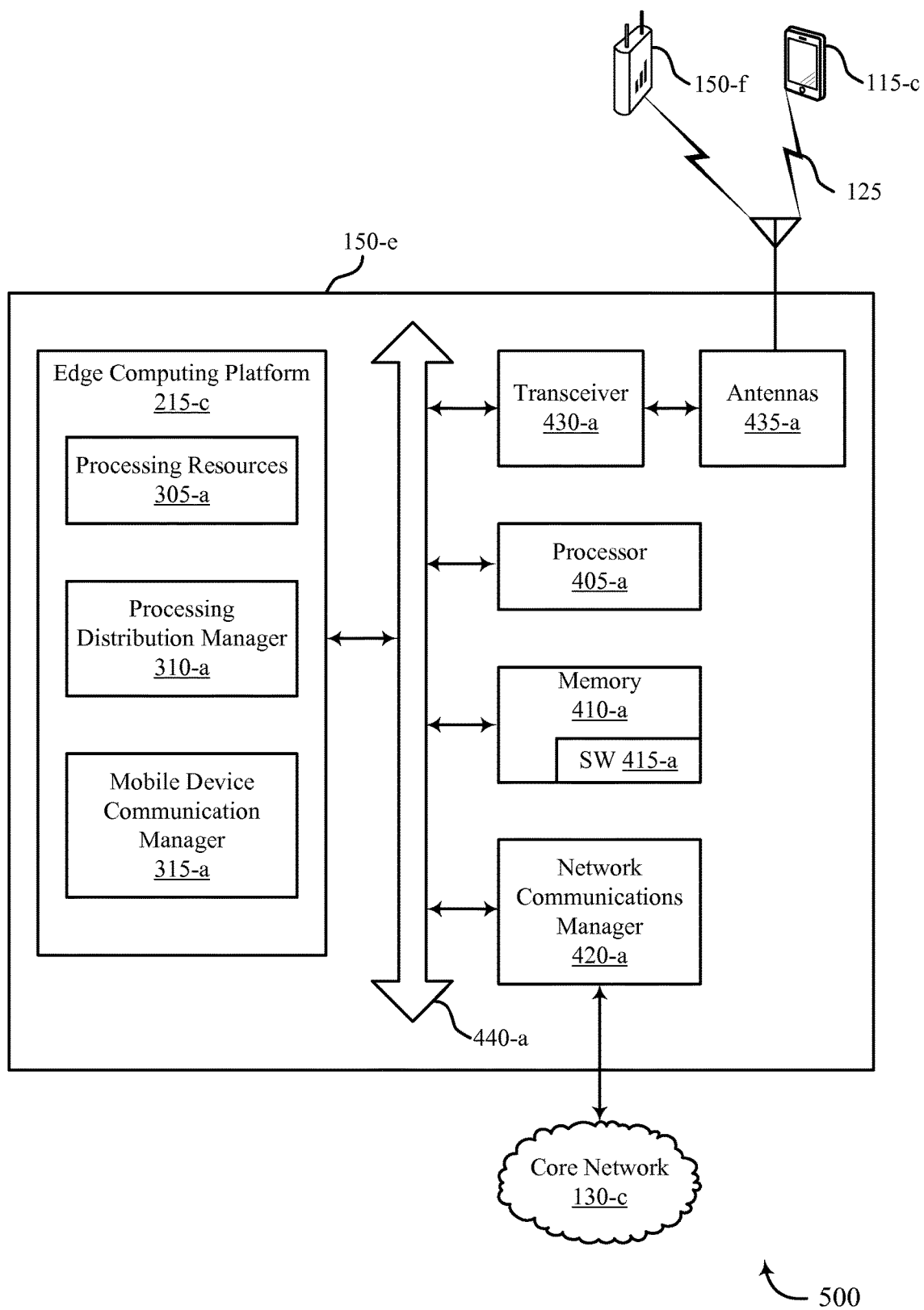
FIG. 5 shows a block diagram of a wireless communications system, in accordance with various aspects of the present disclosure.

FIG. 5 shows a block diagram 500 of a wireless communications system, in accordance with various aspects of the present disclosure. The wireless communication system includes a small cell base station 150-e, which may be an example of aspects of a small cell base station 150 described with reference to FIGS. 1-4. The small cell base station 150-e includes a transceiver 430-a, antennas 435-b, processor 405-a, memory 410-a (including SW 415-a), each of which may perform the functions described with reference to FIG. 4, and each of which may communicate, directly or indirectly, with one another (e.g., via bus 440-a).

Small cell base station 150-e may include an edge computing platform 215-c. The edge computing platform 215-c may be an example of aspects of an edge computing platform 215, 215-a, 215-c described with reference to FIGS. 2-4. The edge computing platform 215 may include processing resources 305-a, a processing distribution manager 310-a, and a mobile device communication manager 315-a, each of which may perform the functions described with reference to FIG. 3.

For example, the processing distribution manager 310-a may determine the processing responsibilities for the small cell base station 150-e and associated wireless devices (e.g., wireless device 115-c). The processing distribution manager 310-a may assign the processing responsibilities based on the operational state or communication parameters of a target wireless device 115 (e.g., radio link conditions, battery life, power consumption, temperature, available processing, etc.). For instance, the processing distribution manager 310-*a* may monitor or observe the condition of a radio link (e.g., radio link 125) and determine processing distribution based on condition. In some cases, the processing distribution manager 310-*a* may assign the small cell base station 150-*e* different responsibilities for different wireless device 115. For example, the small cell base station 150-*e* may perform more processing for data intended for target wireless device 115-*c* than for data intended for a target wireless device 115 (not shown). Put another way, the processing responsibilities may be distributed on a per-wireless device basis (e.g., based on the conditions or state of the individual wireless devices). In certain aspects, the processing responsibilities may be different for different types of data. That is, the processing responsibilities assigned to the small cell base station 150-*e* and the associated target wireless device 115 may be dependent on the type of data (e.g., the small cell base station 150-*e* may apply different processing to video data than still-image data).

The processing resources 305-*a* may perform processing functions according to the decisions made by the processing distribution manager 310-*a*. The processing functions may include compressing and decompressing data, rendering data, and evaluating data. In some cases, the data is received (e.g., via network communications manager 420-*a*) from the core network 160-*c*. The processing resources 305-*a* may manipulate the received data for transmission to a target wireless device 115. In some cases, the processing resources 305-*a* of small cell base station 150-*e* may be capable of different functions than the processing resources 305 of a different edge computing device 145. The processing resources 305-*a* may be configured to provide different levels or types of data processing for data intended for different target wireless devices 115, or for different types of data. In certain aspects, the processing resources 305-*a* may facilitate the downloading of multiple versions of the same data (e.g., the same video clip may be downloaded from different platforms). The versions may be downloaded according to a request from a wireless device 115, or in anticipation of a request from a wireless device 115 (e.g., the versions may be pre-downloaded). The processing distribution manager 310-*a* may dynamically determine which version of the data to send to a wireless device 115 based on conditions associated with the wireless device 115. For example, the selection of the data version may be based on the quality of the radio link 125 or an operational state of the wireless device 115 (e.g., the processing capabilities or processing availability of the wireless device 115).

The processing distribution manager 310-*a* may learn or determine operational state information of a target wireless device 115 via communications with the target wireless device. In some cases, information for wireless device 115-*c* may be obtained via communications with a different communications device (e.g., small cell base station 150-*e* may receive the information from small cell base station 150-*f*). The communications may be in response to a query, or request, initiated by the mobile device communication manager 315-*a*. For example, the mobile device communication manager 315-*a* may, in conjunction with the transceiver 430-*a* and antennas 435-*b*, send a request for operation state information pertaining to wireless device 115-*c* to small cell base station 150-*e* (or wireless device 115-*c*). Based on the request, the mobile device communication manager 315-*a* may, in conjunction with the antennas 435-*b* and transceiver 430-*a*, receive operational state information (e.g., included in an operation state report). The operational state information may include battery life information, power consumption information, temperature information, or processing availability information associated with the wireless device 115).

In some cases, the processing distribution manager 310-*a* may compare the operational state information to corresponding thresholds and determine processing assignments based at least in part on the comparison. For example, the processing distribution manager 310-*a* may compare the reported battery life information to a battery life threshold. In some cases, the mobile device communication manager 315-*a* may request (and receive), via transceiver 430-*a*, antennas 435-*b*, information indicating the processing capabilities of a wireless devices 115. Based on the indicated processing capabilities, the processing distribution manager 310-*a* may distribute processing responsibilities.

In certain aspects, there may be distinct, pre-defined operational states with which a wireless device may be associated. For example, there may be X operational states, each of which may be associated with a different configuration of processing distribution. Thus, an small cell base station 150-*e* may determine the operational state for a target wireless device 115 and assign processing responsibilities accordingly. The operational state may be determined based on operational information for the wireless device 115 (e.g., a combination of the battery life and processing power of the wireless device 115). Alternatively, the operational state may be directly received from the wireless device 115 (e.g., the operational state may be based on an indication of the operational state of the wireless device 115 that is included in a report). That is, the wireless device 115 may determine its own operational state and report the state to the small cell base station 150-*e*.

In some cases, the devices may be prioritized so that the requirements of higher priority devices are satisfied before the requirements of lower priority devices. For example, a smart watch that is running on low power reserves may be prioritized over its associated edge computing device 145 so that the smart watch performs less processing functions with respect to the edge computing device 145. Similar to the distribution of processing responsibilities, the prioritization of devices may be dynamically updated. In some cases, the small cell base station 150-*e* may be part of a cluster of edge computing devices 145 within a number of small cells. The cluster of edge computing devices 145 may exchange information relevant to dynamic processing distribution or data pre-loading. Small cell base station 150-*e* may serve as the cluster-head and as such direct, guide, or influence the activities of other small cell base stations 150 within the cluster.

Figure 6:
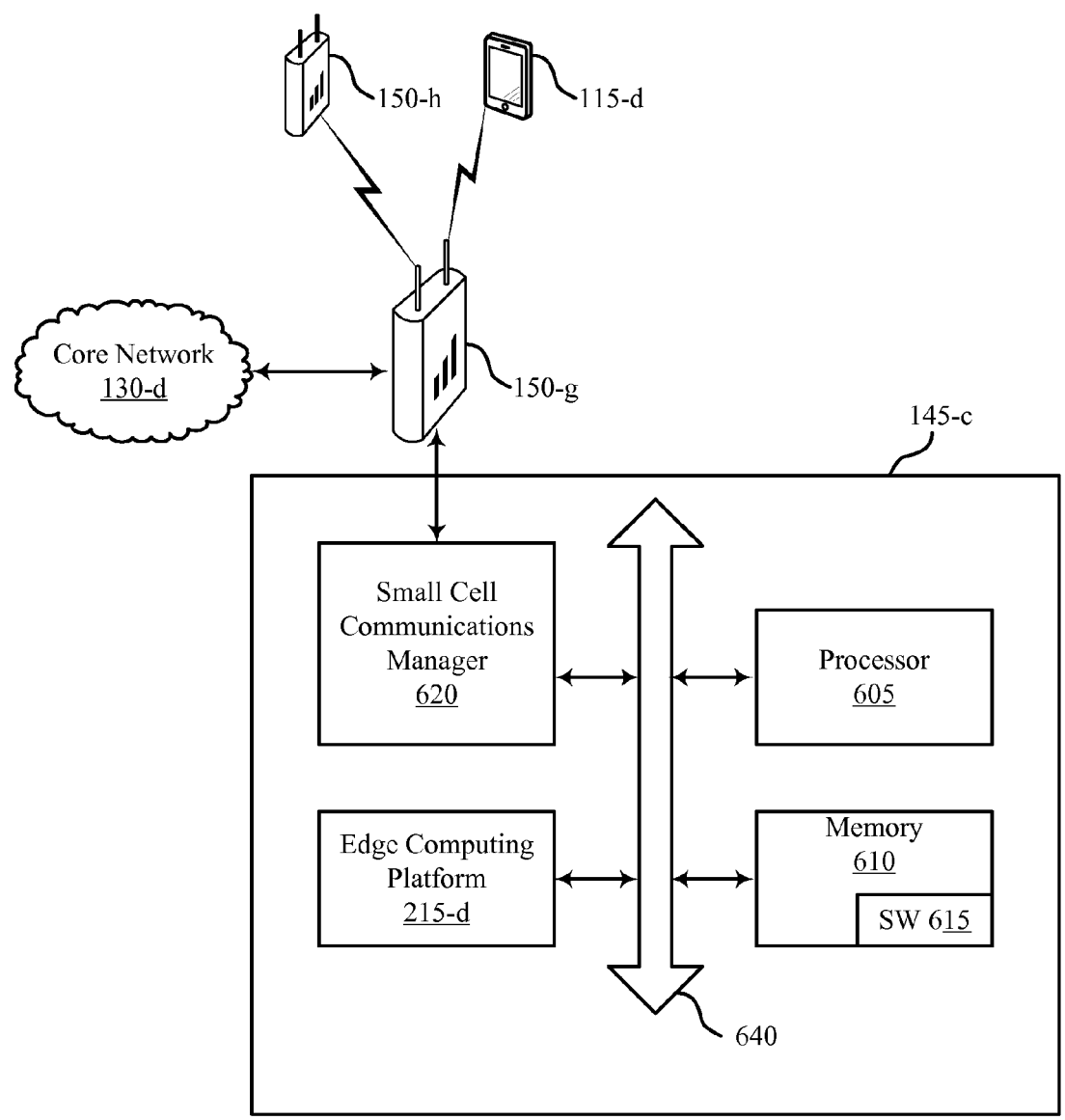
FIG. 6 shows a diagram that illustrates an edge computing device configured for providing edge computing resources co-located with the small cell base station, in accordance with various aspects of the present disclosure.

FIG. 6 shows a diagram 600 that illustrates an edge computing device 145-*c* configured for providing edge computing resources co-located with a small cell base station 150-*g*, in accordance with various aspects of the present disclosure. In FIG. 6, the small cell base station 150-*g* is physically distinct from the edge computing device 145-*c*. Edge computing device 145-*c* may include a processor 605, a memory 610, a small cell communications manager 620, and an edge computing platform 215-*d*.

The edge computing platform 215-*d* may be one or more aspects of an example of the edge computing platform 215 of FIGS. 2-5. Edge computing platform 215-*d* may communicate with a core network 130-*d* to which a small cell base station 150-*g* is connected via the small cell communications manager 620 of the edge computing device 145-*c*. In some aspects, the small cell base station 150-*g* and the small cell base station 150-*h* may be an example of the small cell base stations 150 of FIGS. 1A-1B and 4-5 and wireless device 115-*d* may be an example of the wireless devices 115 of FIGS. 1A-1B and 4-5.

The components of edge computing device 145-*c* may be configured to implement aspects discussed above with reference to FIGS. 1A-5, and those aspects may not be repeated here for the sake of brevity.

The processor 605 may be an example of the processor 405 of FIG. 4. The processor 605 may include an intelligent hardware device (e.g., a CPU, a microcontroller, an ASIC, etc.). The processor 605 may process information received through the small cell communications manager 620 or edge computing platform 215-*d*. The processor 605 may also process information to be sent to the transceiver 430 for transmission through the small cell communications manager 620. The processor 605 may handle, alone or in connection with the edge computing platform 215-*d*, various aspects related to providing edge computing resources to wireless devices 115 in communication with the small cell base station 150-*g*. In some examples, the processor 605 is the edge computing platform 215-*d*.

The memory 610 may be an example of the memory 410 of FIG. 4. The memory 610 may store computer-readable, computer-executable software (SW) code 615 containing instructions that are configured to, when executed, cause the processor 605 to perform various functions described herein to provide edge computing resources to wireless devices 115 in communication with a small cell, for example as further described with reference to FIGS. 1A-5. Alternatively, the code 615 may not be directly executable by the processor 605 but be configured to cause the computer (e.g., when compiled and executed), to perform functions described herein.

Moreover, the components of the edge computing device 145-*c* may be configured to implement aspects discussed below with respect to respect to FIGS. 7-11 and those aspects may not be repeated here also for the sake of brevity.

Figure 7:
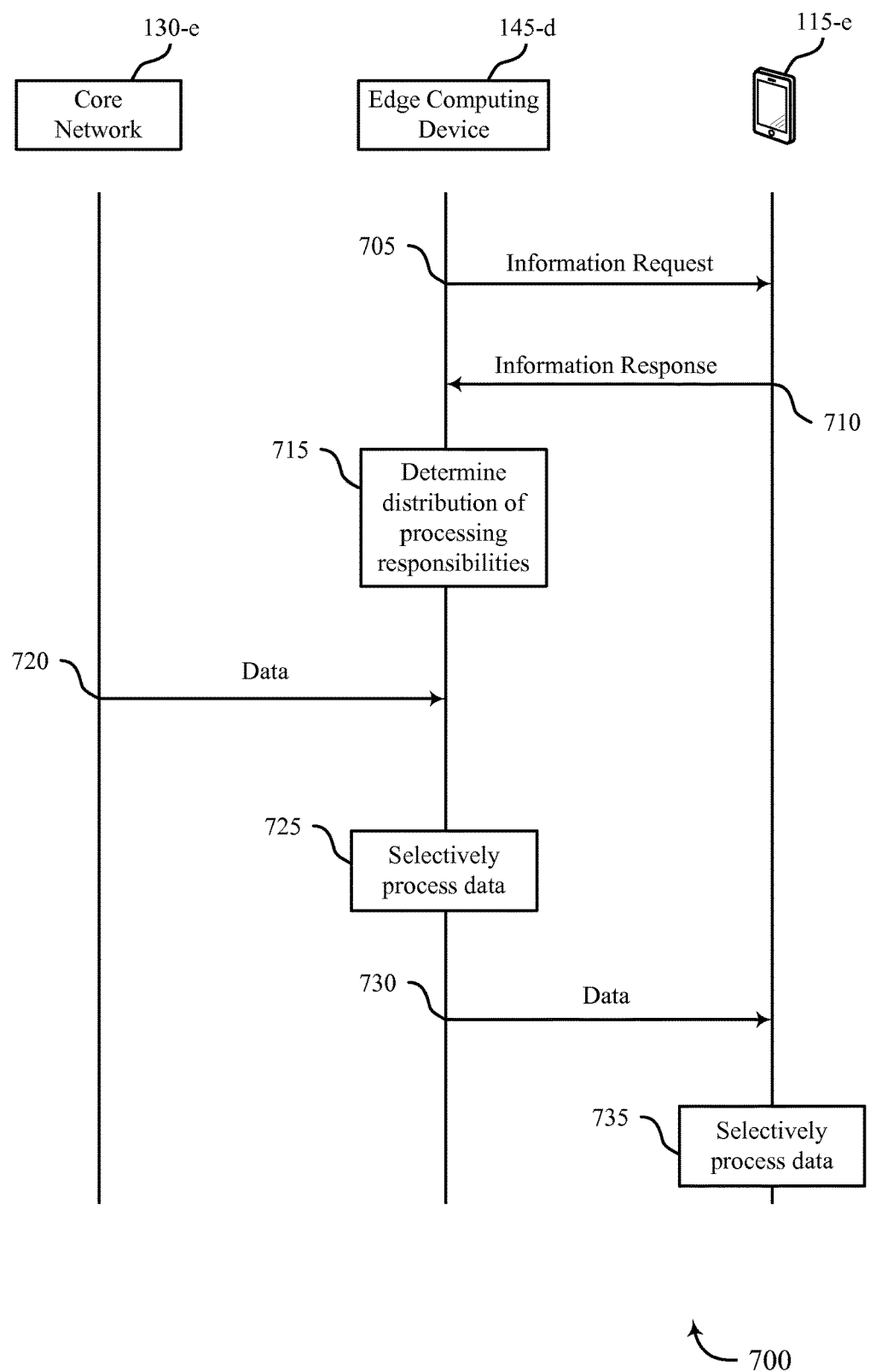
FIG. 7 illustrates a process flow that supports an edge computing platform in accordance with various aspects of the present disclosure.

FIG. 7 illustrates an example of a process flow 700 that supports an edge computing platform, in accordance with various aspects of the present disclosure. Process flow 700 may include a core network 130-*e* (e.g., the evolved packet core (EPC)), an edge computing device 145-*d*, and a wireless device 115-*e*. The edge computing device 145-*d* may be included in or co-located with a small cell base station 150 as described with reference to FIGS. 2-7. Thus, the edge computing device 145-*d* may distribute processing responsibilities among devices according to the techniques described herein.

At 705, the edge computing device 145-*d* may send an information request to the wireless device 115-*e*. The information requested may be battery life information, power consumption information, temperature information, processing availability information, processing capabilities information, operational state information, channel condition information, etc. The information may be associated with wireless device 115-*e*. In some cases, the edge computing device 145-*d* may request information regarding the past, present, and/or future (e.g., predicted) actions of wireless device 115-*e*. At 710, the wireless device 115-*e* may respond to the request by sending an information response to the edge computing device 145-*d*. The information response may include the data indicated by the information request. In some cases, the report may be sent independent of the information request (e.g., the report may be sent periodically, at the behest another communication device, or based on a change in conditions at the wireless device 115-*e*).

At 715, the edge computing device 145-*d* may determine the distribution of processing responsibilities among the edge computing device 145-*d* and the wireless device 115-*e*. The distribution may be such that the process responsibilities are assigned entirely to the edge computing device 145-*d*, entirely by the wireless device 115-*e*, or shared between the edge computing device 145-*d* and the wireless device 115-*e*. In some cases, the processing work-load may be further shared with other devices (e.g., split among other edge computing device 145). The allocation of processing responsibilities may be based at least in part on the information received at 710. Proceeding to 710, the edge computing device 145-*d* may receive data from the core network 130-*e* (e.g., EPC). The data may be audio, video, text, email, web content, etc. In some cases, the distribution of processing may be based at least in part on the type of data received.

At 725, the edge computing device 145-*d* may selectively process the received data. The edge computing device 145-*d* may select which processing functions to perform based on the distribution of processing responsibilities. For instance, in some cases, the edge computing device 145-*d* may refrain from processing the data. In other examples, the edge computing device 145-*d* may perform all of the processing available for or supported by distributed processing. Alternatively, the edge computing device 145-*d* may perform a share of the processing functions as determined by the distribution of processing responsibilities at 715. Proceeding to 730, the edge computing device 145-*d* may transmit the data to the wireless device 115-*e*. The data may be semi-processed according to the selection at 725. At 735, the wireless device 115-*e* may selectively process the received data. The processing may occur according to the distribution of responsibility. Thus, the wireless device may complete or finish the processing of the data, regardless of the state of the data upon reception.

Figure 8:
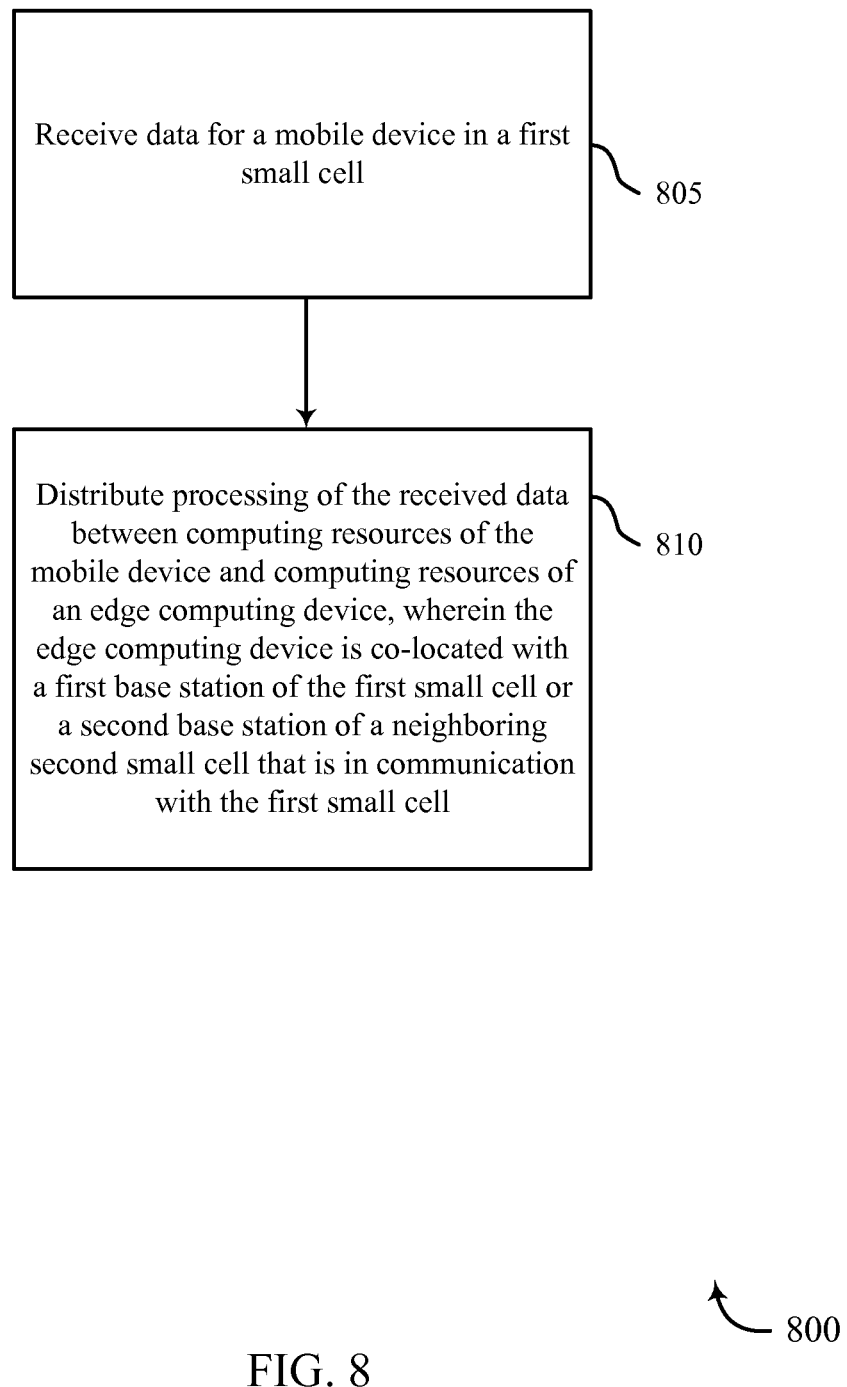
FIG. 8 shows a flowchart illustrating a method for dynamic allocation of processing responsibilities between an edge computing device and a wireless device in accordance with various aspects of the present disclosure.

FIG. 8 shows a flowchart illustrating a method 800 for dynamic allocation of processing responsibilities between an edge computing device and a wireless device in accordance with various aspects of the present disclosure. The operations of method 800 may be implemented by an edge computing device or its components as described with reference to FIGS. 1-7. For example, the operations of method 800 may be performed by the edge computing platform 215 as described with reference to FIGS. 2-7. In some examples, a device may execute a set of codes to control the functional elements of the device to perform the functions described below. Additionally or alternatively, the device may perform aspects the functions described below using special-purpose hardware.

At 805, the device may receive data for a mobile device in a first small cell. The device may be an edge computing device or a small cell base station. In certain examples, the operations of block 805 may be performed by the receiver 210, in conjunction with the mobile device communication manager 315, as described with reference to FIGS. 2 and 3. Proceeding to 810, the device may distribute processing of the received data between computing resources of the mobile device and computing resources of an edge computing device. The edge computing device may be co-located with a first base station of the first small cell or a second base station of a neighboring second small cell that is in communication with the first small cell. In certain examples, the operations of block 810 may be performed by the processing distribution manager 310 as described with reference to FIG. 3.

Figure 9:
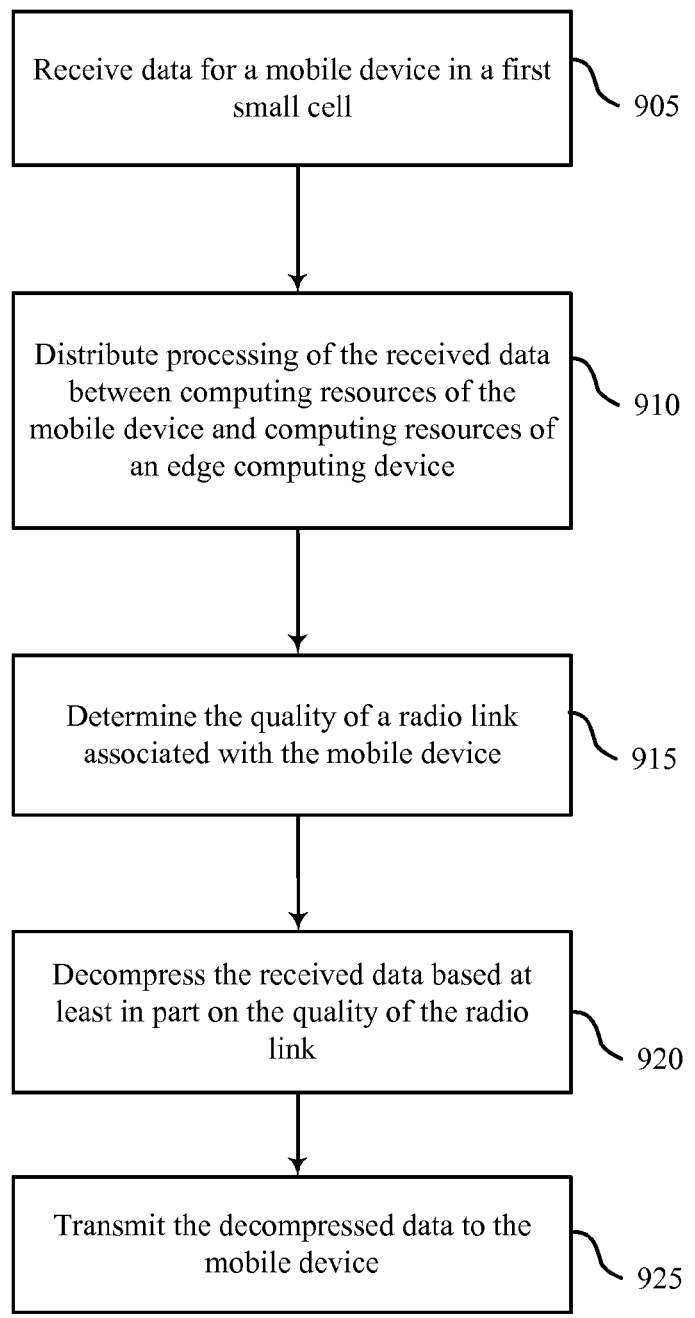
FIG. 9 shows a flowchart illustrating a method for dynamic allocation of processing responsibilities between an edge computing device and a wireless device in accordance with various aspects of the present disclosure.

FIG. 9 shows a flowchart illustrating a method 900 for dynamic allocation of processing responsibilities between an edge computing device and a wireless device in accordance with various aspects of the present disclosure. The operations of method 900 may be implemented by an edge computing device or its components as described with reference to FIGS. 1-7. For example, the operations of method 900 may be performed by the edge computing platform 215 as described with reference to FIGS. 2-7. In some examples, a device may execute a set of codes to control the functional elements of the device to perform the functions described below. Additionally or alternatively, the device may perform aspects the functions described below using special-purpose hardware. The method 900 may also incorporate aspects of method 800 of FIG. 8.

At 905, the device may receive data for a mobile device in a first small cell. The device may be a small cell base station or an edge computing device. In certain examples, the operations of block 905 may be performed by the receiver 210, in conjunction with the mobile device communication manager 315, as described with reference to FIGS. 2 and 3. At 910, the device may distribute processing of the received data between computing resources of the mobile device and computing resources of an edge computing device. In certain examples, the operations of block 910 may be performed by the processing distribution manager 310 as described with reference to FIG. 3. Proceeding to 915, the device may determine the quality of a radio link associated with the mobile device. The radio link may be between the device and mobile device. In certain examples, the operations of block 915 may be performed or facilitated by the mobile device communication manager 315 as described with reference to FIG. 3.

At 920, the device may decompress the received data based at least in part on the quality of the radio link. For example, the device may determine that the quality of the radio link satisfies a quality threshold and decide to decompress the data. In other cases, the device may determine that the quality of the radio link does not satisfy a quality threshold and refrain from decompressing the video. At 925, the device may transmit the decompressed data to the mobile device. In certain examples, the operations of block 915 may be performed or facilitated by the mobile device communication manager 315 as described with reference to FIG. 3.

Figure 10:
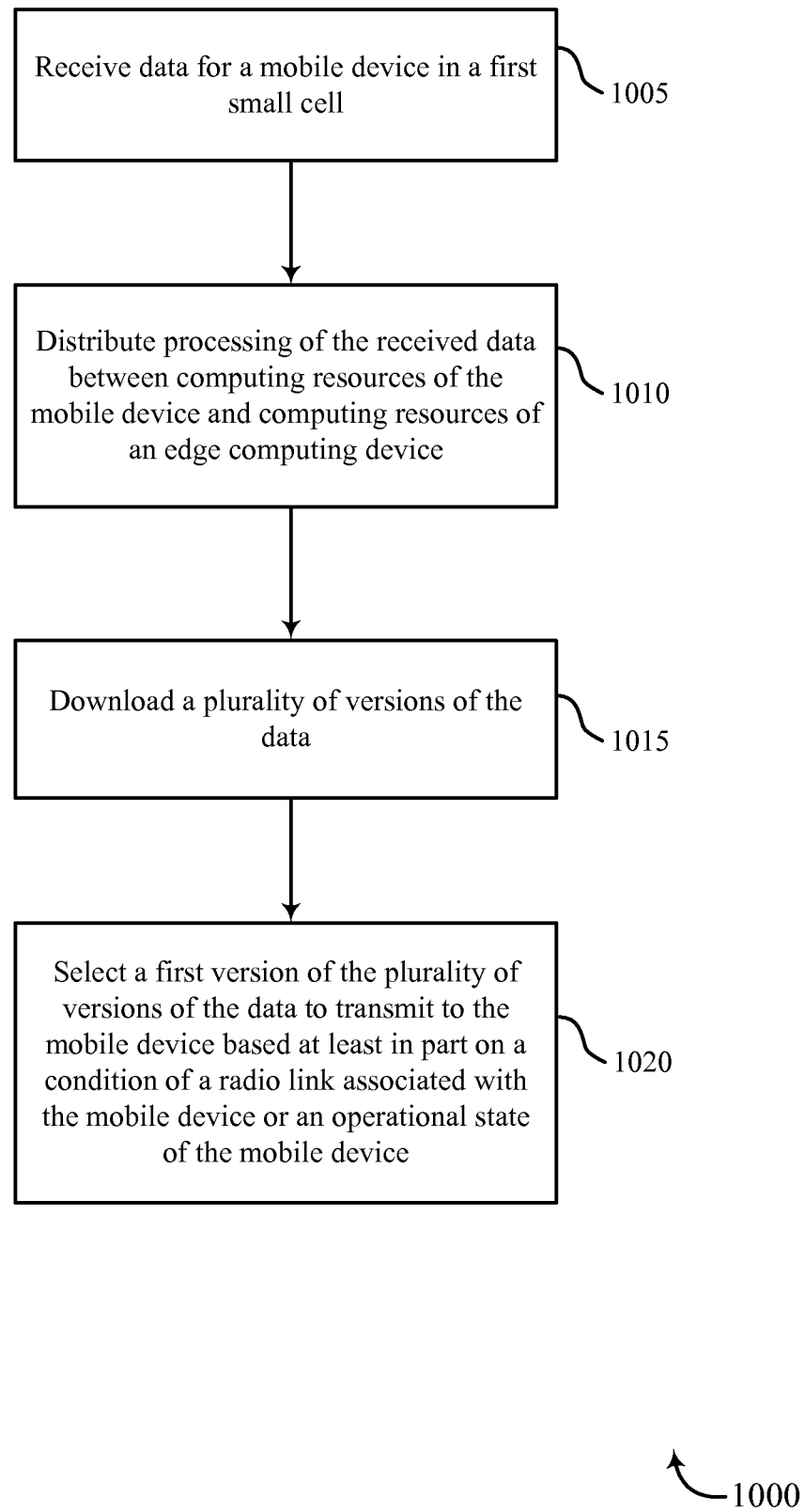
FIG. 10 shows a flowchart illustrating a method for dynamic allocation of processing responsibilities between an edge computing device and a wireless device in accordance with various aspects of the present disclosure.

FIG. 10 shows a flowchart illustrating a method 1000 for dynamic allocation of processing responsibilities between an edge computing device and a wireless device in accordance with various aspects of the present disclosure. The operations of method 1000 may be implemented by an edge computing device or its components as described with reference to FIGS. 1-7. For example, the operations of method 1000 may be performed by the edge computing platform 215 as described with reference to FIGS. 2-7. In some examples, a device may execute a set of codes to control the functional elements of the device to perform the functions described below. Additionally or alternatively, the device may perform aspects the functions described below using special-purpose hardware. The method 1000 may also incorporate aspects of methods 800 and 900 of FIGS. 8 and 9.

At 1005, the device may receive data for a mobile device in a first small cell. The device may be a small cell base station or an edge computing device. In certain examples, the operations of block 1005 may be performed by the receiver 210, in conjunction with the mobile device communication manager 315, as described with reference to FIGS. 2 and 3. At 1010, the device may distribute processing of the received data between computing resources of the mobile device and computing resources of an edge computing device. Proceeding to 1015, the device may download a plurality of versions of the data. The versions may be associated with different rates or resolutions, and may be downloaded from a number of different sources. At 1020, the device may select a first version of the plurality of versions of the data to transmit to the mobile device based at least in part on the condition of a radio link associated with the mobile device or the operational state of the mobile device. In certain examples, the operations of block 1010, 1015, and 1020 may be performed by the processing distribution manager 310 as described with reference to FIG. 3.

Figure 11:
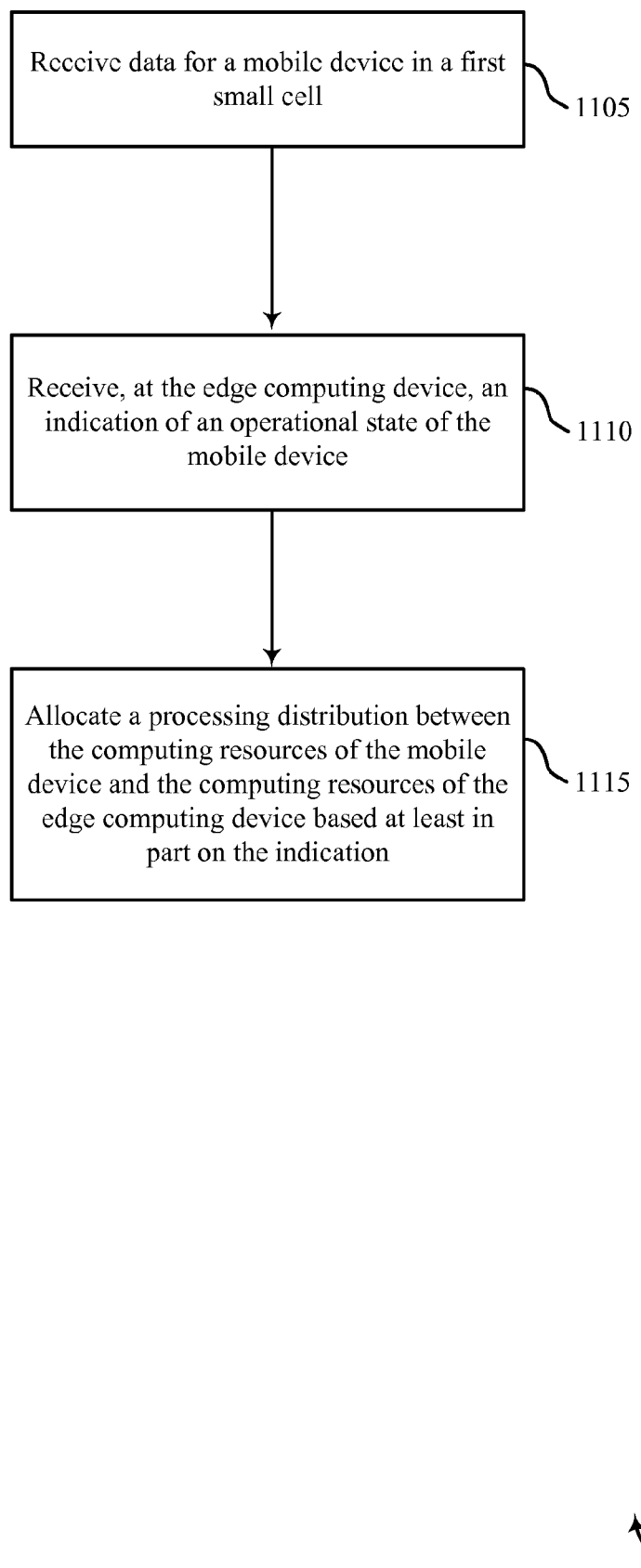
FIG. 11 shows a flowchart illustrating a method for dynamic allocation of processing responsibilities between an edge computing device and a wireless device in accordance with various aspects of the present disclosure.

FIG. 11 shows a flowchart illustrating a method 1100 for dynamic allocation of processing responsibilities between an edge computing device and a wireless device in accordance with various aspects of the present disclosure. The operations of method 1100 may be implemented by an edge computing device or its components as described with reference to FIGS. 1-7. For example, the operations of method 1100 may be performed by the edge computing platform 215 as described with reference to FIGS. 2-7. In some examples, a device may execute a set of codes to control the functional elements of the device to perform the functions described below. Additionally or alternatively, the device may perform aspects the functions described below using special-purpose hardware. The method 1100 may also incorporate aspects of methods 800, 900, and 1000 of FIGS. 8, 9, and 10.

At 1105, the device may receive data for a mobile device in a first small cell. The device may be a small cell base station or an edge computing device. In certain examples, the operations of block 1105 may be performed by the receiver 210, in conjunction with the mobile device communication manager 315, as described with reference to FIGS. 2 and 3. At 1110, the device may receive an indication of an operation state of the mobile device. The indication may include information regarding the power state of the mobile device, the processing capabilities of the mobile device, or the processing availability of the mobile device. The indication may be received from the mobile device or from another entity. In certain examples, the operations of block 1110 may be performed or facilitated by the mobile device communication manager 315 as described with reference to FIG. 3. Proceeding to 1115, the device may allocate a processing distribution between the computing resources of the mobile device and the computing resources of an edge computing device. The allocation may be based at least in part on the indication of the operational state of the mobile device. In certain examples, the operations of block 1115 may be performed or facilitated by the processing distribution manager 310 as described with reference to FIG. 3.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving a plurality of versions of data to be delivered to a mobile device in a first small cell, the plurality of versions of data compressed with a first compression algorithm and comprising different versions of the same data; and
   distributing processing of the plurality of versions of data between computing resources of the mobile device and computing resources of an edge computing device based at least in part on a processing capability of the mobile device, wherein the edge computing device is co-located with a first base station of the first small cell or a second base station of a neighboring second small cell that is in communication with the first small cell, and wherein distributing the processing of the plurality of versions of data between the computing resources comprises:
      selecting a version of data of the plurality of versions of data to transmit to the mobile device based at least in part on an operating context of the mobile device or a quality of a radio link used for communication between the mobile device and the first base station;
      decompressing the version of data compressed with the first compression algorithm; and
      recompressing the decompressed version of data according to a second compression algorithm that has a lower compression level than the first compression algorithm and that is based at least in part on the processing capability of the mobile device and the quality of the radio link used for communication between the mobile device and the first base station.

2. The method of claim 1, further comprising:
   determining the quality of the radio link between the mobile device and the first base station; and
   transmitting the recompressed version of data to the mobile device.

3. The method of claim 1, wherein the operating context comprises at least one of a user preference, a power state of the mobile device, a processing headroom of the mobile device, or a time of day.

4. The method of claim 1, further comprising:
   observing a condition of the radio link used for communication between the mobile device and the first base station; and
   determining the quality of the radio link based at least in part on the condition of the radio link.

5. The method of claim 1, further comprising:
receiving, at the edge computing device, an indication of an operating context of the mobile device; and
allocating a processing distribution between the computing resources of the mobile device and the computing resources of the edge computing device based at least in part on the indication.

6. The method of claim 5, further comprising:
comparing the indication against a threshold associated with the operating context of the mobile device, wherein the threshold is a processing availability threshold, a power availability threshold, or a temperature threshold.

7. The method of claim 1, further comprising:
receiving a processing capability report from the mobile device; and
processing the plurality of versions of data based at least in part on the processing capability report.

8. The method of claim 1, further comprising:
receiving video data;
determining the quality of the radio link between the mobile device and the first base station; and
rendering the video data based at least in part on the quality of the radio link.

9. The method of claim 1, further comprising:
receiving audio data for the mobile device;
decompressing audio data for transmission to the mobile device, the decompressing based at least in part on the quality of the radio link; and
transmitting the decompressed audio data to the mobile device for playback on the mobile device.

10. The method of claim 1, wherein wireless communication resources of the first base station are housed in a first module; and
the edge computing device is housed in a second module in communication with and co-located with the first module.

11. The method of claim 1, wherein:
the first small cell is one of a first picocell, a first femtocell, a first microcell, or a first Wi-Fi access point; and
the neighboring second small cell is one of a second picocell, a second femtocell, a second microcell, or a second Wi-Fi access point.

12. The method of claim 1, wherein the first small cell comprises a wireless wide area network (WWAN) transceiver and a wireless local area network (WLAN) transceiver.

13. An apparatus for wireless communication at a wireless device, comprising:
means for receiving a plurality of versions of data to be delivered to a mobile device in a first small cell, the plurality of versions of data compressed with a first compression algorithm and comprising different versions of the same data; and
means for distributing processing of the plurality of versions of data between computing resources of the mobile device and computing resources of an edge computing device based at least in part on a processing capability of the mobile device, wherein the edge computing device is co-located with a first base station of the first small cell or a second base station of a neighboring second small cell that is in communication with the first small cell, and wherein the means for distributing the processing of the plurality of versions of data between the computing resources comprises:
means for selecting a version of data of the plurality of versions of data to transmit to the mobile device based at least in part on an operating context of the mobile device or a quality of a radio link used for communication between the mobile device and the first base station;
means for decompressing the version of data compressed with the first compression algorithm; and
means for recompressing the decompressed version of data according to a second compression algorithm that has a lower compression level than the first compression algorithm and that is based at least in part on the processing capability of the mobile device and the quality of the radio link used for communication between the mobile device and the first base station.

14. The apparatus of claim 13, further comprising:
means for determining the quality of the radio link between the mobile device and the first base station; and
means for transmitting the recompressed version of data to the mobile device.

15. The apparatus of claim 13, wherein the operating context comprises at least one of a user preference, a power state of the mobile device, a processing headroom of the mobile device, or a time of day.

16. The apparatus of claim 13, further comprising:
means for observing a condition of the radio link used for communication between the mobile device and the first base station; and
means for determining the quality of the radio link based at least in part on the condition of the radio link.

17. The apparatus of claim 13, further comprising:
means for receiving, at the edge computing device, an indication of an operating context of the mobile device; and
means for allocating a processing distribution between the computing resources of the mobile device and the computing resources of the edge computing device based at least in part on the indication.

18. The apparatus of claim 17, further comprising:
means for comparing the indication against a threshold associated with the operating context of the mobile device, wherein the threshold is a processing availability threshold, a power availability threshold, or a temperature threshold.

19. The apparatus of claim 13, further comprising:
means for receiving a processing capability report from the mobile device; and
means for processing the plurality of versions of data based at least in part on the processing capability report.

20. The apparatus of claim 13, further comprising:
means for determining the quality of the radio link between the mobile device and the first base station; and
means for rendering video data based at least in part on the quality of the radio link.

21. The apparatus of claim 13, further comprising:
means for receiving audio data for the mobile device;
means for decompressing audio data for transmission to the mobile device, the decompressing based at least in part on the quality of the radio link; and
means for transmitting the decompressed audio data to the mobile device for playback on the mobile device.

22. The apparatus of claim 13, wherein
wireless communication resources of the first base station are housed in a first module; and
the edge computing device is housed in a second module in communication with and co-located with the first module.

23. The apparatus of claim 13, wherein:
the first small cell is one of a first picocell, a first femtocell, a first microcell, or a first Wi-Fi access point; and
the neighboring second small cell is one of a second picocell, a second femtocell, a second microcell, or a second Wi-Fi access point.

24. The apparatus of claim 13, wherein the first small cell comprises a wireless wide area network (WWAN) transceiver and a wireless local area network (WLAN) transceiver.

25. An apparatus for communication at a wireless device, comprising:
a processor;
memory in electronic communication with the processor; and
instructions stored in the memory, wherein the instructions are executable by the processor to:
receive a plurality of versions of data to be delivered to a mobile device in a first small cell, the plurality of versions of data compressed with a first compression algorithm and comprising different versions of the same data; and
distribute processing of the plurality of versions of data between computing resources of the mobile device and computing resources of an edge computing device based at least in part on a processing capability of the mobile device, wherein the edge computing device is co-located with a first base station of the first small cell or a second base station of a neighboring second small cell that is in communication with the first small cell, and wherein instructions executable to distribute the processing of the plurality of versions of data between the computing resources comprise instructions executable to:
select a version of data of the plurality of versions of data to transmit to the mobile device based at least in part on an operating context of the mobile device or a quality of a radio link used for communication between the mobile device and the first base station;
decompress the version of data compressed with the first compression algorithm; and
recompress the decompressed version of data according to a second compression algorithm that has a lower compression level than the first compression algorithm and that is based at least in part on the processing capability of the mobile device and the quality of the radio link used for communication between the mobile device and the first base station.

26. The apparatus of claim 25, wherein the instructions are executable by the processor to:
determine the quality of the radio link between the mobile device and the first base station; and
transmit the recompressed version of data to the mobile device.

27. The apparatus of claim 25, wherein the instructions executable to distribute the processing of the plurality of versions of data between computing resources are further executable by the processor to:
observe a condition of the radio link used for communication between the mobile device and the first base station; and
determine the quality of the radio link based at least in part on the condition of the radio link.

28. A non-transitory computer-readable medium storing code for communication at a wireless device, the code comprising instructions executable to:
receive a plurality of versions of data to be delivered to a mobile device in a first small cell, the plurality of versions of data compressed with a first compression algorithm and comprising different versions of the same data; and
distribute processing of the the plurality of versions of data between computing resources of the mobile device and computing resources of an edge computing device based at least in part on a processing capability of the mobile device, wherein the edge computing device is co-located with a first base station of the first small cell or a second base station of a neighboring second small cell that is in communication with the first small cell, and wherein the instructions executable to distribute the processing of the plurality of versions of data between the computing resources comprise instructions executable to:
select a version of data of the plurality of versions of data to transmit to the mobile device based at least in part on an operating context of the mobile device or a quality of a radio link used for communication between the mobile device and the first base station;
decompress the version of data compressed with the first compression algorithm; and
recompress the decompressed version of data according to a second compression algorithm that has a lower compression level than the first compression algorithm and that is based at least in part on the processing capability of the mobile device and the quality of the radio link used for communication between the mobile device and the first base station.

* * * * *